(12) United States Patent
Namboodiri et al.

(10) Patent No.: US 11,533,203 B2
(45) Date of Patent: Dec. 20, 2022

(54) LATTICE REDUCTION IN WIRELESS COMMUNICATION

(71) Applicant: Cohere Technologies, Inc., Santa Clara, CA (US)

(72) Inventors: Vamadevan Namboodiri, Santa Clara, CA (US); Ronny Hadani, Santa Clara, CA (US); James Delfeld, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/445,707

(22) Filed: Aug. 23, 2021

(65) Prior Publication Data
US 2021/0399926 A1 Dec. 23, 2021

Related U.S. Application Data

(63) Continuation of application No. 16/643,731, filed as application No. PCT/US2018/049759 on Mar. 2, 2020, now Pat. No. 11,102,034.
(Continued)

(51) Int. Cl.
*H04W 4/80* (2018.01)
*H04L 25/03* (2006.01)
(Continued)

(52) U.S. Cl.
CPC .......... *H04L 25/03019* (2013.01); *H04L 1/06* (2013.01); *H04L 5/0007* (2013.01);
(Continued)

(58) Field of Classification Search
CPC . H04L 5/0048; H04L 27/2647; H04L 5/0007; H04L 25/03343; H04L 27/2639;
(Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| WO | 2011150315 | 12/2011 |
| WO | 2013148546 | 10/2013 |

(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.
(Continued)

*Primary Examiner* — Eva Y Puente
(74) *Attorney, Agent, or Firm* — Perkins Coie LLP

(57) ABSTRACT

Methods, systems and devices for lattice reduction in decision feedback equalizers for orthogonal time frequency space (OTFS) modulation are described. An exemplary wireless communication method, implementable by a wireless communication receiver apparatus, includes receiving a signal comprising information bits modulated using OTFS modulation scheme. Each delay-Doppler bin in the signal is modulated using a quadrature amplitude modulation (QAM) mapping. The method also includes estimating the information bits based on an inverse of a single error covariance matrix of the signal, with the single error covariance matrix being representative of an estimation error for all delay-Doppler bins in the signal.

20 Claims, 10 Drawing Sheets

Related U.S. Application Data

(60) Provisional application No. 62/554,982, filed on Sep. 6, 2017.

(51) Int. Cl.
    *H04L 1/06*               (2006.01)
    *H04L 5/00*               (2006.01)
    *H04L 27/26*              (2006.01)

(52) U.S. Cl.
    CPC .... *H04L 25/03159* (2013.01); *H04L 27/2639* (2013.01); *H04L 27/2647* (2013.01); *H04W 4/80* (2018.02)

(58) Field of Classification Search
    CPC ............. H04L 25/0222; H04L 25/4975; H04L 5/0023; H04W 4/80; H04W 80/02; H04W 84/12; H04W 72/121; H04W 76/15; H04W 88/02; H04B 7/0417; H04B 7/0413; H04B 7/0626; H04B 7/0854; H04B 7/0452; H04B 7/0689; H04B 7/0443; H04B 7/0697
    USPC .................................................. 375/262, 340
    See application file for complete search history.

(56) References Cited

U.S. PATENT DOCUMENTS

| | | | |
|---|---|---|---|
| 5,182,642 | A | 1/1993 | Gersdorff et al. |
| 5,623,511 | A | 4/1997 | Bar-David et al. |
| 5,831,977 | A | 11/1998 | Dent |
| 5,872,542 | A | 2/1999 | Simons et al. |
| 5,956,624 | A | 9/1999 | Hunsinger et al. |
| 6,212,246 | B1 | 4/2001 | Hendrickson |
| 6,289,063 | B1 | 9/2001 | Duxbury |
| 6,356,555 | B1 | 3/2002 | Rakib et al. |
| 6,388,621 | B1 | 5/2002 | Lynch |
| 6,426,983 | B1 | 7/2002 | Rakib et al. |
| 6,608,864 | B1 | 8/2003 | Strait |
| 6,631,168 | B2 | 10/2003 | Izumi |
| 6,704,366 | B1 | 3/2004 | Combes et al. |
| 6,956,814 | B1 | 10/2005 | Campanella |
| 7,327,812 | B2 | 2/2008 | Auer |
| 7,392,018 | B1 | 6/2008 | Ebert et al. |
| 7,773,685 | B2 | 8/2010 | Tirkkonen et al. |
| 7,864,877 | B2 | 1/2011 | Hottinen |
| 8,229,017 | B1 | 7/2012 | Lee et al. |
| 8,259,845 | B2 | 9/2012 | Dent |
| 8,401,131 | B2 | 3/2013 | Fety et al. |
| 8,547,988 | B2 | 10/2013 | Hadani et al. |
| 8,619,892 | B2 | 12/2013 | Vetter et al. |
| 8,879,378 | B2 | 11/2014 | Rakib et al. |
| 8,892,048 | B1 | 11/2014 | Turner |
| 8,976,851 | B2 | 3/2015 | Hadani et al. |
| 9,031,141 | B2 | 5/2015 | Hadani et al. |
| 9,071,285 | B2 | 6/2015 | Hadani et al. |
| 9,071,286 | B2 | 6/2015 | Hadani et al. |
| 9,083,483 | B1 | 7/2015 | Rakib et al. |
| 9,083,595 | B2 | 7/2015 | Rakib et al. |
| 9,130,638 | B2 | 9/2015 | Hadani et al. |
| 9,282,528 | B2 | 3/2016 | Hashimoto |
| 9,294,315 | B2 | 3/2016 | Hadani et al. |
| 9,444,514 | B2 | 9/2016 | Hadani et al. |
| 9,548,840 | B2 | 1/2017 | Hadani et al. |
| 9,553,984 | B2 | 1/2017 | Krause et al. |
| 9,590,779 | B2 | 3/2017 | Hadani et al. |
| 9,634,719 | B2 | 4/2017 | Rakib et al. |
| 9,660,851 | B2 | 5/2017 | Hadani et al. |
| 9,667,307 | B1 | 5/2017 | Hadani et al. |
| 9,668,148 | B2 | 5/2017 | Hadani et al. |
| 9,712,354 | B2 | 7/2017 | Hadani et al. |
| 9,722,741 | B1 | 8/2017 | Rakib et al. |
| 9,729,281 | B2 | 8/2017 | Hadani et al. |
| 10,148,470 | B1 * | 12/2018 | Derras ................. H04B 7/0413 |
| 10,651,912 | B2 | 5/2020 | Wang et al. |
| 10,667,148 | B1 | 5/2020 | Hadani et al. |
| 10,681,568 | B1 | 6/2020 | Hadani et al. |
| 10,693,581 | B2 | 6/2020 | Rakib et al. |
| 10,693,692 | B2 | 6/2020 | Hadani et al. |
| 10,716,095 | B2 | 7/2020 | Rakib et al. |
| 10,749,651 | B2 | 8/2020 | Hebron et al. |
| 10,826,728 | B2 | 11/2020 | Tsatsanis et al. |
| 10,855,425 | B2 | 12/2020 | Kons et al. |
| 10,873,418 | B2 | 12/2020 | Kons et al. |
| 10,886,991 | B2 | 1/2021 | Akoum et al. |
| 11,050,530 | B2 | 6/2021 | Wang et al. |
| 2001/0031022 | A1 | 10/2001 | Petrus et al. |
| 2001/0033614 | A1 | 10/2001 | Hudson |
| 2001/0046205 | A1 | 11/2001 | Easton et al. |
| 2002/0001308 | A1 | 1/2002 | Heuer |
| 2002/0034191 | A1 | 3/2002 | Shattil |
| 2002/0181388 | A1 | 12/2002 | Jain et al. |
| 2002/0181390 | A1 | 12/2002 | Mody et al. |
| 2002/0181607 | A1 | 12/2002 | Izumi |
| 2003/0073464 | A1 | 4/2003 | Giannakis et al. |
| 2003/0185295 | A1 | 10/2003 | Yousef |
| 2003/0235147 | A1 | 12/2003 | Walton et al. |
| 2004/0044715 | A1 | 3/2004 | Aldroubi et al. |
| 2004/0174812 | A1 | 9/2004 | Murakami et al. |
| 2004/0189581 | A1 | 9/2004 | Sako et al. |
| 2004/0218523 | A1 | 11/2004 | Varshney et al. |
| 2005/0157778 | A1 | 7/2005 | Trachewsky et al. |
| 2005/0157820 | A1 | 7/2005 | Wongwirawat et al. |
| 2005/0180517 | A1 | 8/2005 | Abe |
| 2005/0207334 | A1 | 9/2005 | Hadad |
| 2005/0251844 | A1 | 11/2005 | Martone et al. |
| 2006/0008021 | A1 | 1/2006 | Bonnet |
| 2006/0039270 | A1 | 2/2006 | Strohmer et al. |
| 2007/0014272 | A1 | 1/2007 | Palanki et al. |
| 2007/0038691 | A1 | 2/2007 | Candes et al. |
| 2007/0058757 | A1 * | 3/2007 | Kusume ............ H04L 25/03019 375/350 |
| 2007/0078661 | A1 | 4/2007 | Sriram et al. |
| 2007/0104283 | A1 | 5/2007 | Han et al. |
| 2007/0110131 | A1 | 5/2007 | Guess et al. |
| 2007/0211952 | A1 | 9/2007 | Faber et al. |
| 2007/0237181 | A1 | 10/2007 | Cho et al. |
| 2007/0253465 | A1 | 11/2007 | Muharemovic et al. |
| 2007/0253504 | A1 | 11/2007 | Hasegawa |
| 2007/0263752 | A1 | 11/2007 | Guey et al. |
| 2008/0043857 | A1 | 2/2008 | Dias et al. |
| 2008/0117999 | A1 | 5/2008 | Kadous et al. |
| 2008/0186843 | A1 | 8/2008 | Ma et al. |
| 2008/0187062 | A1 | 8/2008 | Pan et al. |
| 2008/0232504 | A1 | 9/2008 | Ma et al. |
| 2008/0310383 | A1 | 12/2008 | Kowalski |
| 2009/0080403 | A1 | 3/2009 | Hamdi |
| 2009/0092259 | A1 | 4/2009 | Jot et al. |
| 2009/0103593 | A1 | 4/2009 | Bergamo |
| 2009/0122854 | A1 | 5/2009 | Zhu et al. |
| 2009/0161804 | A1 | 6/2009 | Chrabieh et al. |
| 2009/0196360 | A1 * | 8/2009 | Gan ................... H04L 25/0248 375/260 |
| 2009/0204627 | A1 | 8/2009 | Hadani |
| 2009/0222226 | A1 | 9/2009 | Baraniuk et al. |
| 2009/0303961 | A1 | 12/2009 | Popovic et al. |
| 2010/0001901 | A1 | 1/2010 | Baraniuk et al. |
| 2010/0008432 | A1 | 1/2010 | Kim et al. |
| 2010/0027608 | A1 | 2/2010 | Priotti |
| 2010/0111138 | A1 | 5/2010 | Hosur et al. |
| 2010/0142476 | A1 | 6/2010 | Jiang et al. |
| 2010/0187914 | A1 | 7/2010 | Rada et al. |
| 2010/0238787 | A1 | 9/2010 | Guey |
| 2010/0277308 | A1 | 11/2010 | Potkonjak |
| 2010/0303136 | A1 | 12/2010 | Ashikhmin et al. |
| 2010/0322349 | A1 | 12/2010 | Lee et al. |
| 2011/0007789 | A1 | 1/2011 | Garmany |
| 2011/0110532 | A1 | 5/2011 | Svendsen |
| 2011/0116489 | A1 | 5/2011 | Grandhi |
| 2011/0116516 | A1 | 5/2011 | Hwang et al. |
| 2011/0126071 | A1 | 5/2011 | Han et al. |
| 2011/0131463 | A1 | 6/2011 | Gunnam |
| 2011/0216808 | A1 | 9/2011 | Tong et al. |

(56) References Cited

U.S. PATENT DOCUMENTS

| | | |
|---|---|---|
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0287078 A1* | 10/2013 | Buchacher .......... H04L 25/0232 375/343 |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0032802 A1* | 2/2018 | Lee ...................... G06K 9/6293 |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0287675 A1* | 10/2018 | Sheikh ................ H04B 7/0413 |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |

(56) References Cited

FOREIGN PATENT DOCUMENTS

| | | |
|---|---|---|
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

Catt, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

* cited by examiner

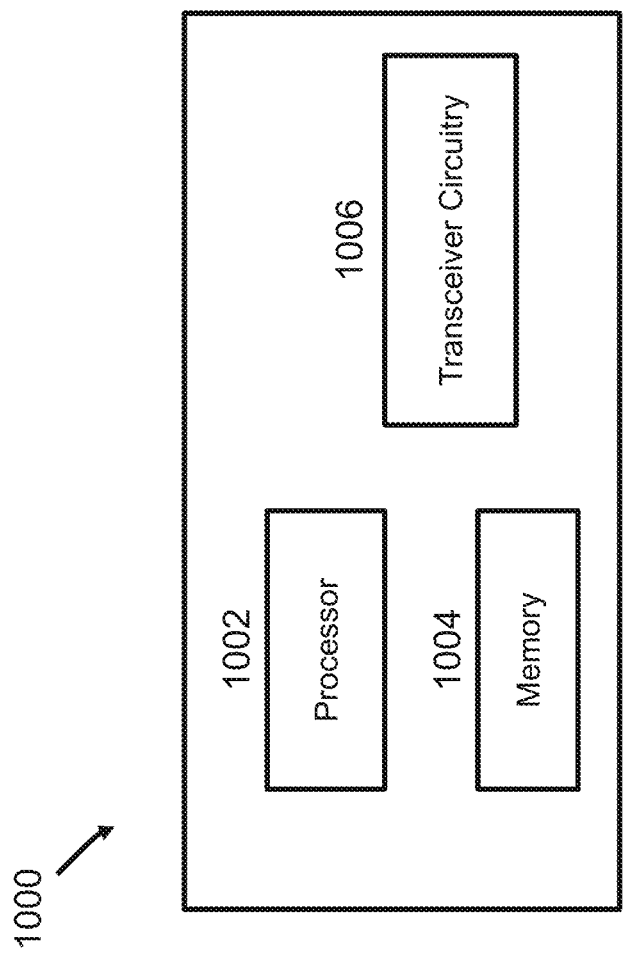

LATTICE REDUCTION IN WIRELESS COMMUNICATION

CROSS-REFERENCE TO RELATED APPLICATIONS

This patent document is a continuation of U.S. patent application Ser. No. 16/643,731, filed Mar. 2, 2020, which is a 371 National Phase Application of PCT Application No. PCT/US2018/049759 entitled "LATTICE REDUCTION IN ORTHOGONAL TIME FREQUENCY SPACE MODULATION" filed on Sep. 6, 2018 which claims priority to and benefits of U.S. Provisional Patent Application No. 62/545,398, entitled "LATTICE REDUCTION IN ORTHOGONAL TIME FREQUENCY SPACE MODULATION" and filed Sep. 6, 2017. The entire content of the before-mentioned patent application is incorporated by reference as part of the disclosure of this patent document.

TECHNICAL FIELD

The present document relates to wireless communication, and more particularly, to signal reception schemes used in wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to implement receivers that receive orthogonal time frequency space (OTFS) modulated symbols and recover information bits from these symbols based, in part, on lattice reduction techniques for OTFS modulation.

In one example aspect, a method for wireless communication implementable at a receiver device is disclosed. The method includes receiving a signal comprising information bits modulated using an orthogonal time frequency space (OTFS) modulation scheme, where each delay-Doppler bin in the signal is modulated using a quadrature amplitude modulation (QAM) mapping, and estimating the information bits based on an inverse of a single error covariance matrix of the signal, where the single error covariance matrix is representative of an estimation error for all delay-Doppler bins in the signal.

In another example aspect, a wireless communication apparatus that implements the above-described method is disclosed.

In yet another example aspect, the method may be embodied as processor-executable code and may be stored on a non-transitory computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 10 is a block diagram of an example of a wireless communication apparatus.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only.

1 Overview of Multiple Input Multiple Output (MIMO) Systems

One of the fundamental attributes of a Multiple Input Multiple Output (MIMO) system is the data transmission rate increase it offers for a given bandwidth. This is achieved by sending several data streams in parallel. Data streams can be coded into parallel stream of QAM symbols and can be transmitted simultaneously from different transmit antennas that are kept appropriately separated. By receiving these signals on a group of receive antenna, these vector of QAM symbols can be detected correctly and thus the transmitted bit streams can be recovered correctly. The capacity increase is proportional to either a) the number of transmit antenna orb) the number of receive antenna, whichever is minimum.

At the receiver, the received QAM vector is typically jointly detected. Optimal QAM vector detection for MIMO channels is extremely computationally intensive. To the point that for reasonable antenna configurations (for example, 4×4 antennas transmitting QAM 64), highly sub-optimal QAM detectors are currently used in practice.

In orthogonal time frequency space (OTFS) modulation, due to the delay-Doppler domain organization of transmitted symbols, all transmitted QAMs vectors experience the same channel. Therefore, after equalization, all QAM vectors will have the same error covariance matrix, denoted by $R_{ee}$. This property is mathematically different from traditional orthogonal frequency division multiplexing (OFDM) based transmissions such as LTE systems because each QAM vector in the traditional OFDM schemes experiences a different channel and therefore the residual error matrix for each QAM vector would be typically different.

Embodiments of the disclosed technology exploit this property of OTFS modulation at receivers to apply a single pre-processing algorithm to $R_{ee}$. After pre-processing the $R_{ee}$, a computationally inexpensive QAM detection algorithm (for example, a Babai detector) can be effectively used for all transmitted QAM vectors. The pre-processing algorithm includes performing lattice reduction, as is disclosed in the present document.

Figure 1:
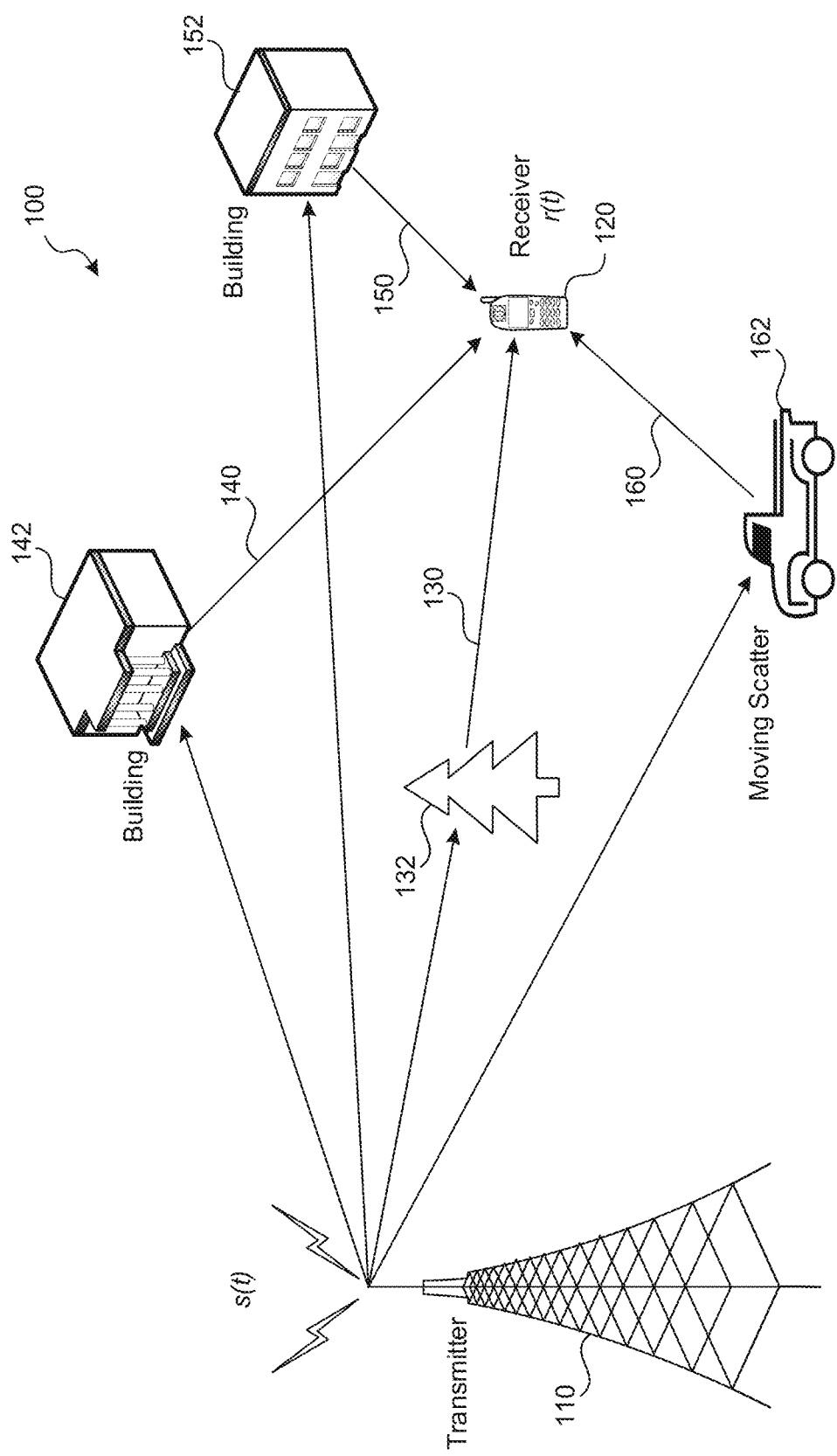
FIG. 1 shows an example of a wireless communication system.

FIG. 1 depicts an example of a wireless communication system 100 where the techniques described in the present document may be embodied. The system 100 may include one or more Base Stations (BS) and one or more User Equipment (UE) 102. The device 102 (marked as Receiver) may be user devices embodied in various forms such as a mobile phone, a smartphone, a tabled, a computer, and so on. The BS (marked as transmitter) may emit downlink transmissions to the UE, 102. The UE (102) may transmit uplink transmissions to the BS (not explicitly shown in the figure). These transmissions may experience distortion and multipath delays due to objects such as moving vehicles, buildings trees and so on. Similarly, the UEs may be moving, and therefore may add Doppler distortion to the received signal at the UE and BS. The methods described in the present document may be implemented by either the UE receiver or BS receiver when receiving transmissions from the BS transmitter or UE transmitter.

1.1 MIMO Channel Detection Problem

Consider a MIMO channel. Assume that QAM signals transmitted on the MIMO channel have unit energy and are represented by:

$$y = Hx + w \quad (1.1)$$

Table 1 below, explains some of the variables used in the sequel.

TABLE 1

| Wireless Object | Notation | Mathematical Object |
| --- | --- | --- |
| Number of transmit antennas | $L_t$ | A positive integer |
| Number of receive antennas | $L_r$ | A positive integer |
| MIMO channel | H | A $L_r \times L_t$ complex matrix |
| Vector of transmitted QAMs | x | A $L_t \times 1$ complex vector |
| Variance of noise | $\sigma_w^2$ | A positive scaler |
| White noise | w | A $\mathcal{N}(0, R_{ww})$ random variable |
| Received vector | y | A $L_r \times 1$ complex vector |

1.2 MMSE Receive Equalizer and Slicer Based QAM Detection

A minimum mean square estimate (MMSE) equalizer finds the most likely transmitted vector in the mean square error sense. This algorithm is typically implemented under the assumption that the noise in the system can be modelled as Additive White Gaussian Noise (AWGN).

If MMSE receive equalizer is denoted by C, then it can be shown that:

$$C = (\sigma_w^{-2} H^* H + I)^{-1} H^* \sigma_w^{-2} \quad (1.2)$$

Applying the MMSE receive equalizer to the received vector gives a vector of soft estimates, denoted as $x_s$, of the transmit vector:

$$x_s = Cy \quad (1.3)$$

A simple symbol detection mechanism can be implemented using a commonly known slicer. This is achieved by mapping the soft-estimate to the nearest QAM constellation points. The vector of soft-estimates must be close to the transmitted QAM vector to ensure a true reception of the transmitted QAM vector.

1.2.1 Residual Error

Let e denote the difference between the soft estimate and the true transmitted vector:

$$e = x - x_s \quad (1.4)$$

Denote covariance of e by $R_{ee}$. Then the theory of MMSE gives:

$$R_{ee} = (\sigma_w^{-2} H^* H + I)^{-1} \quad (1.5)$$

1.2.2 ML Detection Criterion

In certain scenarios, no receiver can perform better than receivers that perform Maximum Likelihood (ML) based symbol detection. ML receivers, however, is computationally intractable, hence implementation of the same is very hard. Embodiments of the disclosed technology implement computationally efficient near-ML receiver for OTFS modulated signals.

The QAM estimation problem can be formulated as follows. The receiver needs to find the most likely transmitted vector of QAMs:

$$x_{ML} = \underset{\tilde{x} \in QAM^{L_t}}{\operatorname{argmax}} \, p(\tilde{x} \mid y) \quad (1.6)$$

Here, the term $QAM^{L_t}$ denotes collection of QAM valued vectors of size $L_t$.

1.2.3 Probability Approximations

For the channel model described in (1.1), the probability $p(\tilde{x}|y)$ can be well approximated by a Gaussian density function with mean $x_s$ and covariance $R_{ee}$.

$$p(\tilde{x} \mid y) \approx \mathcal{N}(x_s, R_{ee})(\tilde{x}) \quad (1.7)$$
$$= (2\pi)^{-\frac{L_t}{2}} |R_{ee}|^{-\frac{1}{2}} \exp\left(-\frac{1}{2}(\tilde{x} - x_s)^* R_{ee}^{-1}(\tilde{x} - x_s)\right).$$

1.2.4 QAM Vector Detection Via Quadratic Minimization

Using the probability approximation, the following simplification can be performed:

$$x_{ML} = \underset{\tilde{x} \in QAM^{L_t}}{\operatorname{argmax}} \; p(\tilde{x} | y) \qquad (1.8)$$

$$\approx \underset{\tilde{x} \in QAM^{L_t}}{\operatorname{argmax}} \; \mathcal{N}(x_s, R_{ee})(\tilde{x})$$

$$= \underset{\tilde{x} \in QAM^{L_t}}{\operatorname{argmin}} \; \|R_{ee}^{-1}(\tilde{x} - x_s)\|^2$$

The search space $QAM^{L_t}$ grows exponentially in $L_t$. For example, when $L_t=4$, and QAM=64 (corresponding to 64 QAM), then $$|QAM^{L_t}| = 16.77e6 \qquad (1.9)$$

It may be possible to use heuristics to speed up the search. However, these "short cuts" may not provide good results (or may not speed up calculations), particularly for ill conditioned channels. In conventional MIMO OFDM (e.g., LTE), a frequency block is divided into subcarriers. QAM vectors are transmitted across each of the subcarriers. Each transmitted QAM vector experiences a different channel. To recover the QAM vectors, a receiver may perform a separate QAM detection for each subcarrier. The computation complexity, above described, thus gets further boosted by the number of data sub-carriers in the system. This further forces the receiver to use suboptimal detection algorithms.

1.3 Preprocessing Stage for Near ML Detection of QAM Vectors

In MIMO OTFS the information to be transmitted is specified in the delay-Doppler domain. Namely, for each delay Doppler bin a vector of QAMs is transmitted.

Table 2 summarizes notation used with respect to MIMO OTFS signals.

TABLE 2

| Wireless Object | Notation | Mathematical object |
|---|---|---|
| Number of transmit antennas | $L_t$ | A positive integer. |
| Number of receive antennas | $L_r$ | A positive integer. |
| Number of delay bins | $N_v$ | A positive integer. |
| Number of Doppler bins | $N_h$ | A positive integer. |
| Vector of QAMs to transmit | X | A $L_t \times N_v \times N_h$ complex array. |

For simplicity, QAM vectors are assumed to have unit average energy. A QAM vector assigned to the delay-Doppler bin $(\tau, v)$ is denoted by $x(\tau, v)$.

A MIMO OTFS system can also be described by (1.1). Here, y denotes the received signal in the delay-Doppler domain, H denotes the channel in delay Doppler domain and w denotes the noise in the delay-Doppler domain. In a typical equalization structure in OTFS, feed-forward equalizer (FFE) is applied in the time-frequency domain and a 2D noise-predicting DFE is applied in the hybrid delay-time domain.

Figure 2:
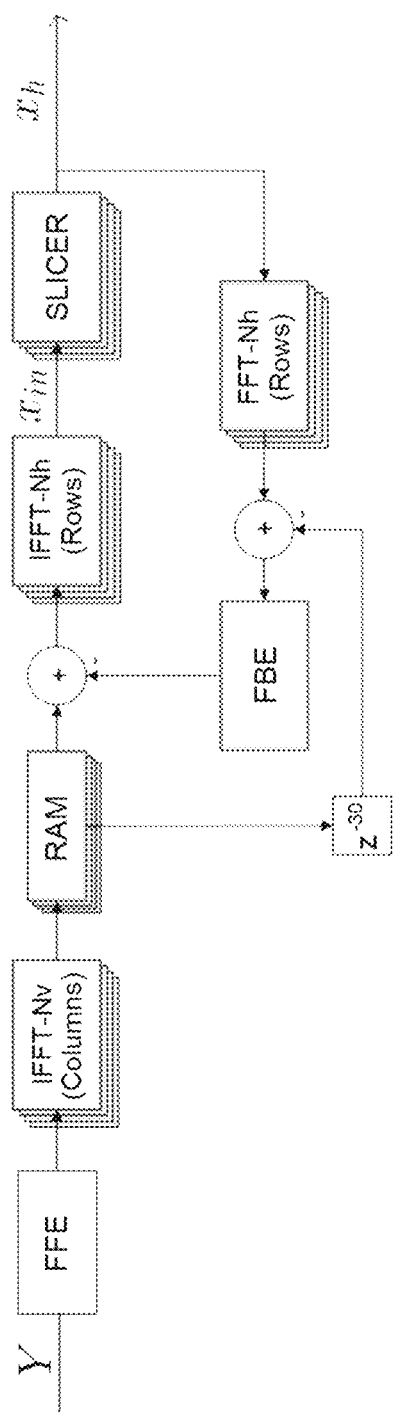
FIG. 2 is a block diagram of an example implementation of Decision Feedback Equalization (DFE) in an OTFS wireless receiver apparatus.

FIG. 2 discloses a block diagram of an example implementation of channel equalization in an OTFS receiver. In FIG. 2, Y denotes the received signal in the time frequency domain, $x_h$ denotes the hard decisions, FFE denotes the feedforward equalizer, and FBE denotes the feedback filter, (I)FFT stands for (inverse) fast Fourier transform and RAM represents memory in which intermediate results are stored. Let $x_{in}(\tau, v)$ denote the $L_t \times 1$ dimensional vector (a set of soft symbols) at delay $\tau$ and Doppler v be input to the slicer. The error between the soft and hard symbols $e_{in}$ is:

$$e_{in} = (\tau, v) = x(\tau, v) - x_{in}(\tau, v). \qquad (1.10)$$

for all delay-Doppler bins $(\tau, v)$.

Due to spreading in OTFS the covariance matrix of the input error is constant across delay and Doppler frame. That is $$\mathbb{E}[e_{in}(\tau, v)e_{in}^*(\tau, v)] = \mathbb{E}[e_{in}(\tau', v')e_{in}^*(\tau', v')] \qquad (1.11)$$

for all pairs of transmission delay-Doppler bins $(\tau, \infty)$ and $(\tau', v')$.

This means a single matrix defines or represents the error covariance for delay Doppler bins of a given transmission frame. Therefore, there exists an $L_t \times L_t$ matrix denoted $R_{ee}^{in}$ such that $$\mathbb{E}[e_{in}(\tau, v)e_{in}^*(\tau, v)] = R_{ee}^{in} \qquad (1.12)$$

for all delay-Doppler bins $(\tau, v)$, $(R_{ee}^{in})^{-1}$ can be obtained as a by-product of the DFE computation. As described earlier, the detection problem can be approximated with a quadratic minimization problem.

$$x_{ML}(\tau, v) \approx \underset{q \in QAM^{L_t}}{\operatorname{argmin}} \|(R_{ee}^{in})^{-1}(x_{in}(\tau, v) - q)\|^2, \qquad (1.13)$$

for all delay-Doppler transmission bins $(\tau, v)$.

If the matrix $(R_{ee}^{in})^{-1}$ is perfectly conditioned, an ordinary slicer that slices each QAM symbol (of the QAM vector) co-ordinate by co-ordinate along the standard lattice of $x_{in}(\tau, v)$ is optimal. In other words, if condition number is close to one, then an ordinary slicer can be a near optimal detector.

In some embodiments, the condition of the matrix $(R_{ee}^{in})^{-1}$ can be improved by performing a scheme called lattice reduction. Section 2 and Section 3 provide a theoretical framework and some implementation examples of lattice reduction algorithms.

Figure 3:
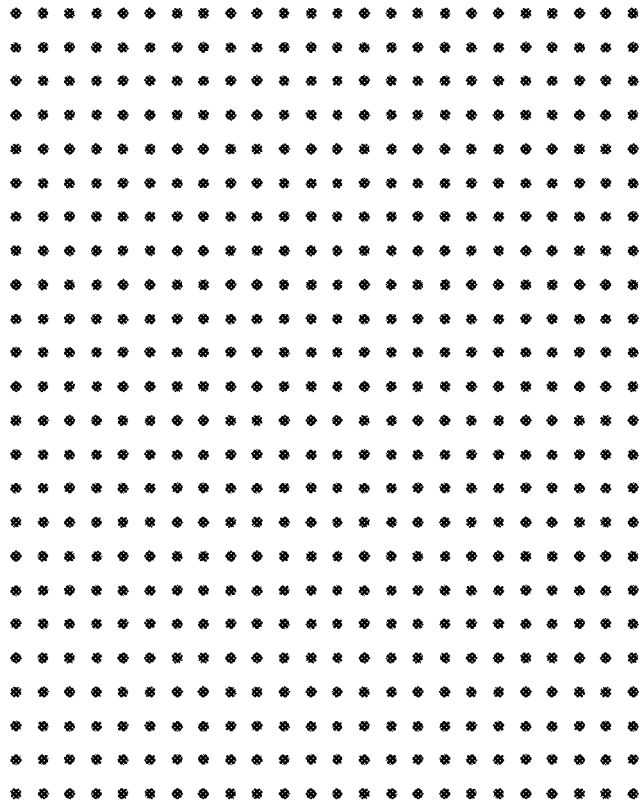
FIG. 3 shows an example of lattice expansion.
Figure 3:
Figure 3:
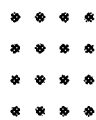

As depicted in FIG. 3, a QAM constellation can be thought of as a small slice of an infinite lattice. The underlying lattice may be denoted as $\Lambda$. A matrix is called a unimodular matrix if all entries are integers and the determinant is one. If a matrix is unimodular, then its inverse is also unimodular. Furthermore, if U is a unimodular matrix of dimensions $L_t \times L_t$, then $$v \in \Lambda^{L_t} \Rightarrow Uv \in \Lambda^{L_t}. \qquad (1.14)$$

For a unimodular matrix U, the pre-conditioned lattice detection problem is $$x_{ML}^U(\tau, v) = \underset{q \in \Lambda^{L_t}}{\arg\min} \left\| (R_{ee}^{in})^{-1} U(U^{-1} x_{in}(\tau, v) - q) \right\|^2. \quad (1.15)$$

Here, q'=U⁻¹q.

There exist algorithms to find a unimodular matrix U that makes $(R_{ee}^{-1})U$ well-conditioned. In some embodiments, a Lenstra-Lenstra-Lovász (LLL) lattice reduction algorithm may be used, and which is further detailed in Sections 2 and 3. Using these results, an OTFS QAM vector detection scheme may be implemented as follows.

1.4 Near ML Detection Using the Pre-Processed Error Covariance Matrix

First, a lattice reduction algorithm may be implemented to find a unimodular matrix U which makes $(R_{ee}^{-1})U$ well-conditioned.

Next, for each delay-Doppler bin the U pre-conditioned detection problem is solved using a computationally inexpensive algorithm (e.g., a Babai detector as described in Section 2).

Then, the result is multiplied by U to get a near ML estimate of the transmitted QAM vector.

As observed earlier, in OTFS all transmitted QAM vectors experience the same channel. Therefore, after MMSE equalization all QAM vectors of a given frame have the same error covariance matrix, (denoted $R_{ee}$). This implies that a single pre-processing algorithm, such as lattice reduction, to $R_{ee}^{-1}$ for a given OTFS frame. This brings significant computational advantages compared to OFDM. After pre-processing any of several well-known QAM detection algorithms can be effectively used for all transmitted QAM vectors.

One of skill in the art would appreciate that this technique cannot be used for standard OFDM systems where each transmitted QAM vector experiences a different channel and hence after equalization has a different residual error matrix.

However, it may be possible to reduce computational complexity in traditional OFDM receivers using some techniques described herein. For example, as described, in the case of OFDM systems, the number of error covariance matrices to pre-process will be equal to the number of data sub-carriers in the system. As was noted, the complexity of approximate ML detection in such systems is very high. However, some simplifications can be done to ease this computational burden. For example, $R_{ee}$ from sub-carriers that have similar channel characteristics can be averaged to get a single average $R_{ee}$. This entity can be taken as the representative $R_{ee}$ for all those sub-carriers. This mechanism can bring down the computational load for OFDM systems, with possibly some degradation in the over-all performance.

2 An Exemplary Embodiment of a MIMO Turbo Equalizer

2.1 Based Hermitian Lattices

Gaussian Integers. We denote by $\mathbb{Z}_i$ the ring of Gaussian integers, i.e., an element $z \in \mathbb{Z}_i$ is a complex number of the form:

$$z = a + bi, \quad (2.1)$$

where $a, b \in \mathbb{Z}$. Gaussian integers constitute the complex generalization of the plain ring of integers $\mathbb{Z} \subset \mathbb{R}$. All the constructions in this manuscript will be derived over $\mathbb{C}(\mathbb{Z}_i)$ with the understanding that they admit a simple counterpart over $\mathbb{R}(\mathbb{Z})$. In particular, when considering a diagrammatic depiction we will restrict to $\mathbb{R}(\mathbb{Z})$ Euclidean metric. Let $R \in \mathbb{C}^{N \times N}$ be a positive definite Hermitian matrix. The matrix R defines an Euclidean metric on $\mathbb{C}^N$ given by:

$$R(x, y) = x^H R y, \quad (2.2)$$

for every $x, y \in \mathbb{C}^N$. We denote by $\|-\|_R$ the norm associated with R, i.e.,:

$$\|x\|_R = \sqrt{R(x, x)}, \quad (2.3)$$

for every $x \in \mathbb{C}^N$. Finally, we denote by $R_N$ the standard Euclidean metric on $\mathbb{C}^N$ given by the unit matrix $I_N$, i.e.,:

$$R_N(x, y) = x^H y, \quad (2.4)$$

We denote the norm associated with $R_N$ simply by $\|-\|$. Finally, given a point $x \in \mathbb{C}^N$, we denote by $B_r(x; R)$ the ball of radius $r > 0$ around x with respect to the metric R, i.e.,:

$$B_r(x; R) = \{y \in \mathbb{C}^N : \|y - x\|_R < r\}. \quad (2.5)$$

Based Hermitian lattices. A based Hermitian lattice (BHL for short) of rank N is a pair $\Upsilon = (G, R)$ where R is an Euclidean metric on $\mathbb{C}^N$ and G is an invertible matrix $G \in \mathbb{C}^{N \times N}$. The matrix G defines a full rank Gaussian lattice $\Lambda \subset \mathbb{C}^N$ Given by:

$$\Lambda = \{\xi[1]g_1 + \xi[2]g_2 + \ldots + \xi[N]g_N : \xi[k] \in \mathbb{Z}_i\}, \quad (2.6)$$

where $g_k$ denotes the kth column of G, i.e.,:

$$G = \begin{bmatrix} | & | & & | & | \\ g_1 & g_2 & \cdot & g_{N-1} & g_N \\ | & | & & | & | \end{bmatrix}. \quad (2.7)$$

Alternatively, the full rank Gaussian lattice can be expressed as:

$$\Lambda = G(\mathbb{Z}_i^N), \quad (2.8)$$

that is, every element $\lambda \in \Lambda$ is uniquely represented as $\lambda = G\xi$ for some $\xi \in \mathbb{Z}_i^N$. We refer to the matrix. G as a basis of the lattice $\Lambda$ and to the integral vector $\xi$ as the coordinates of $\lambda$ with respect to the basis G. The standard example of a rank N based Hermitian lattice is $\Upsilon_N = (I, R_N)$. To summarize, a based Hermitian lattice is a lattice equipped with a basis and residing in a complex vector space equipped with an Euclidean metric. Based Hermitian lattices are objects in a category (in contrast to being points of a set). As consequence they admit multitude of isomorphic representations which we refer to as realizations. To transform from one realization to another one applies two basic operations: change of basis and change of coordinates.

Figure 4:
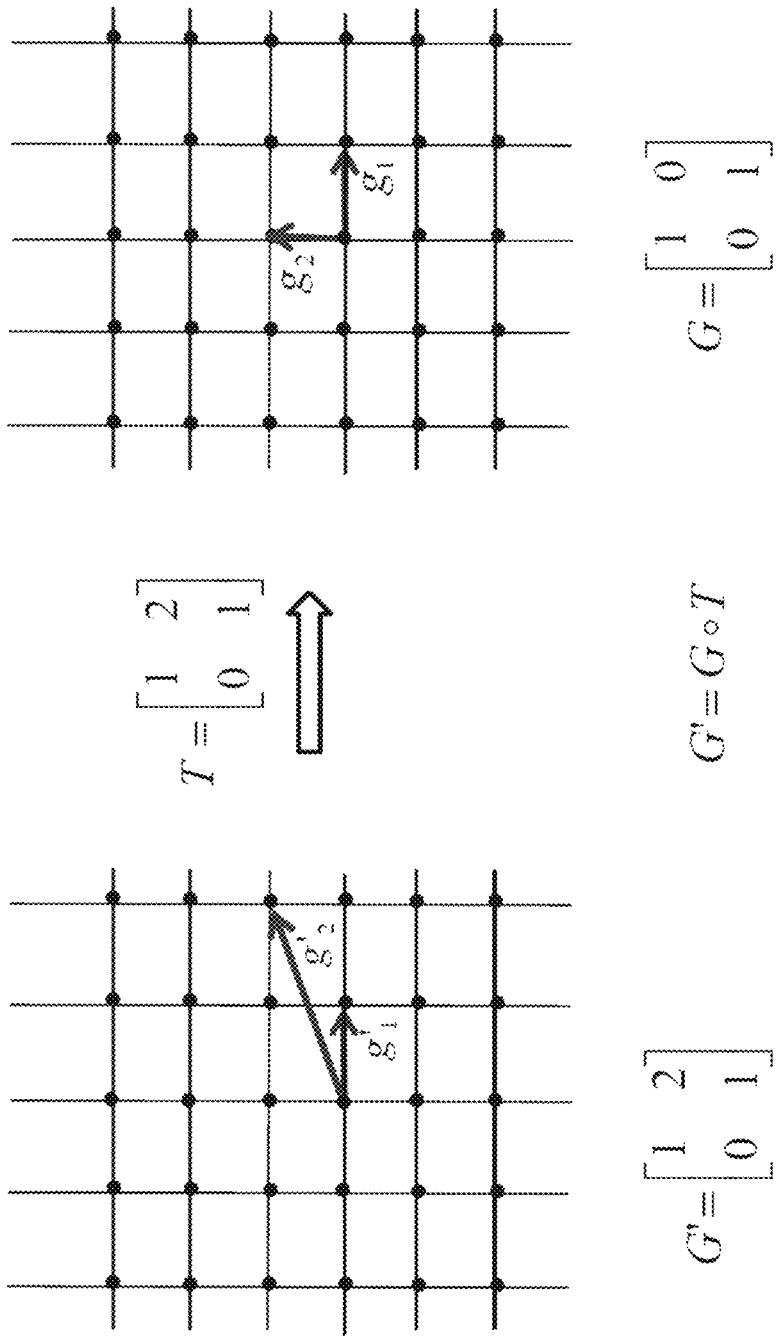
FIG. 4 shows an example of a unipotent change of basis.
Figure 5:
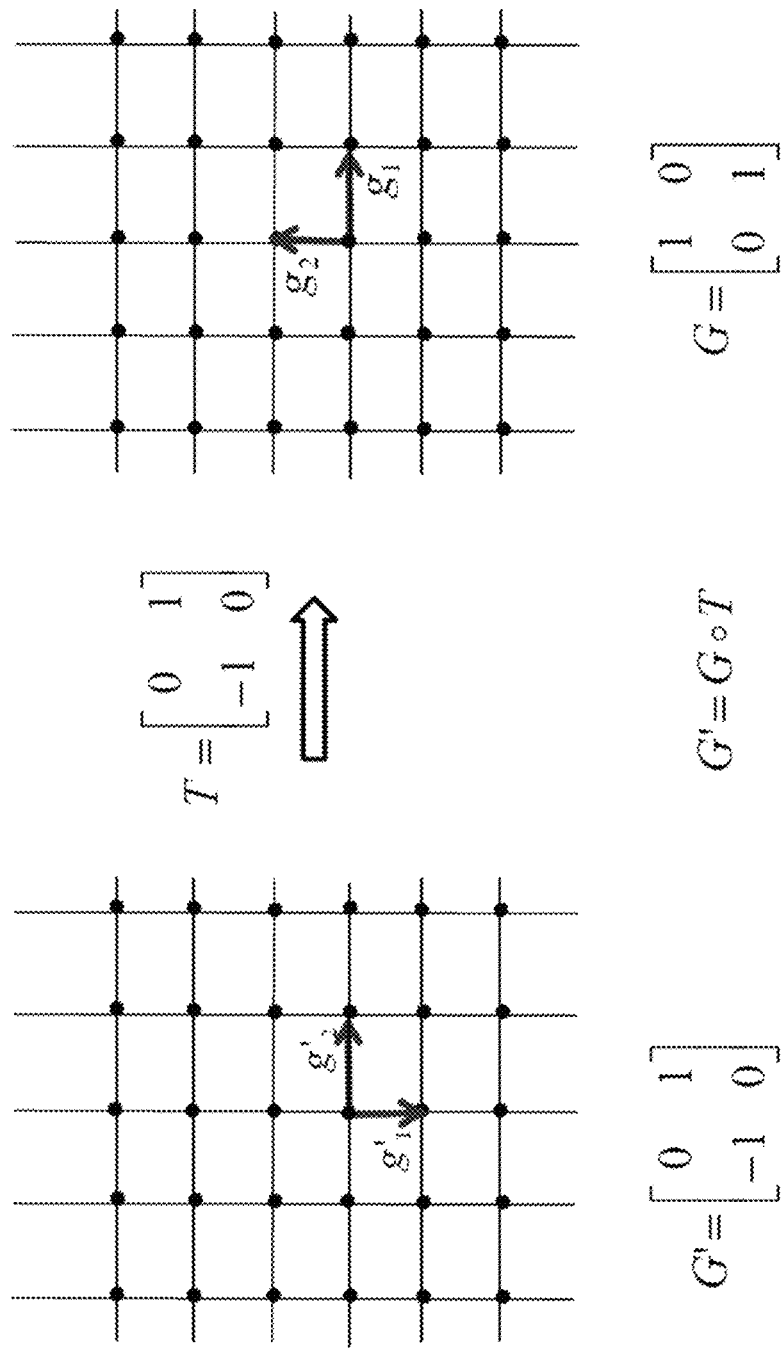
FIG. 5 shows an example of a flip change of basis.
Figure 6:
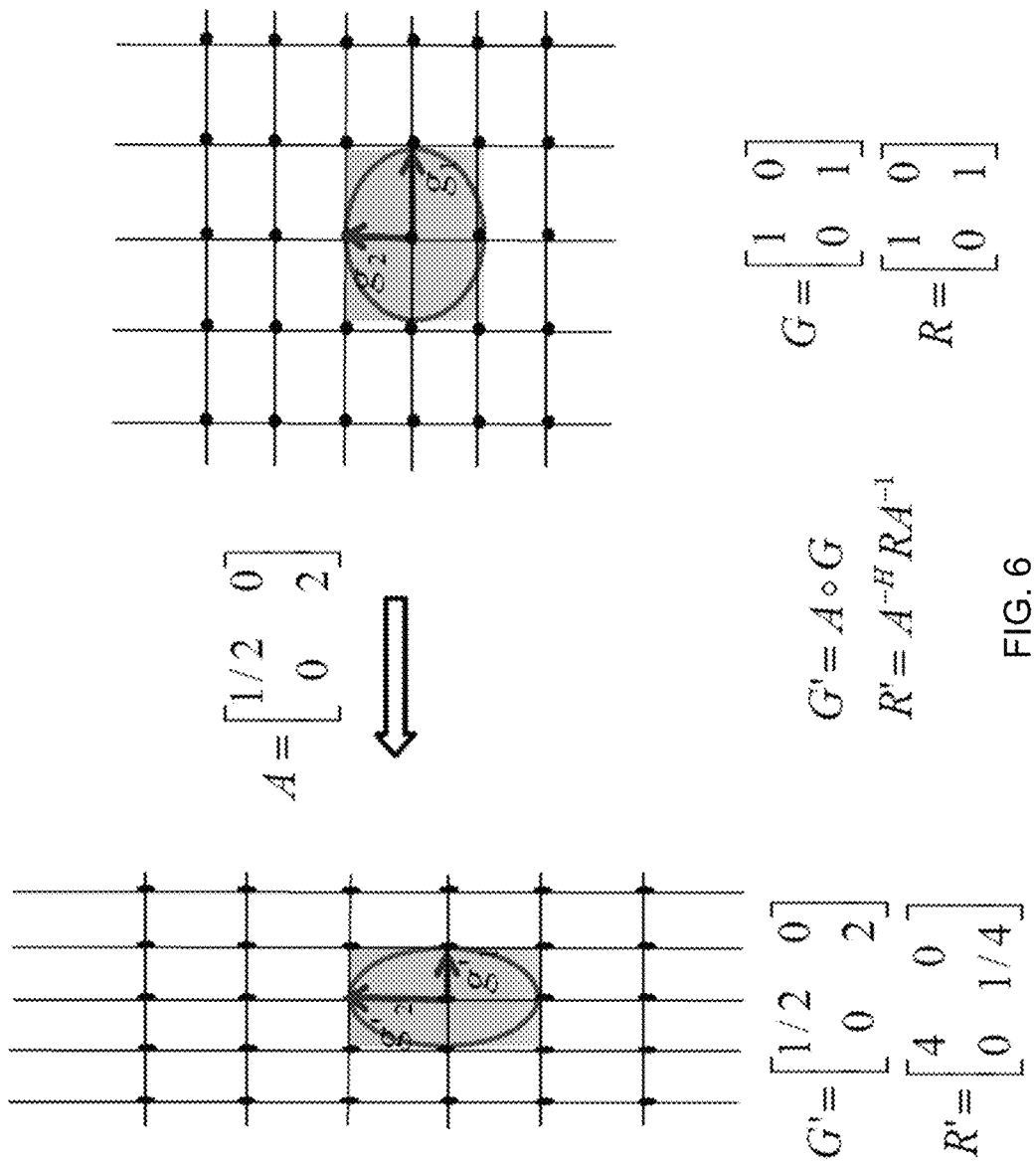
FIG. 6 shows an example of a change of realization transform of a standard rank two real lattice.
Figures 7A, 7B:
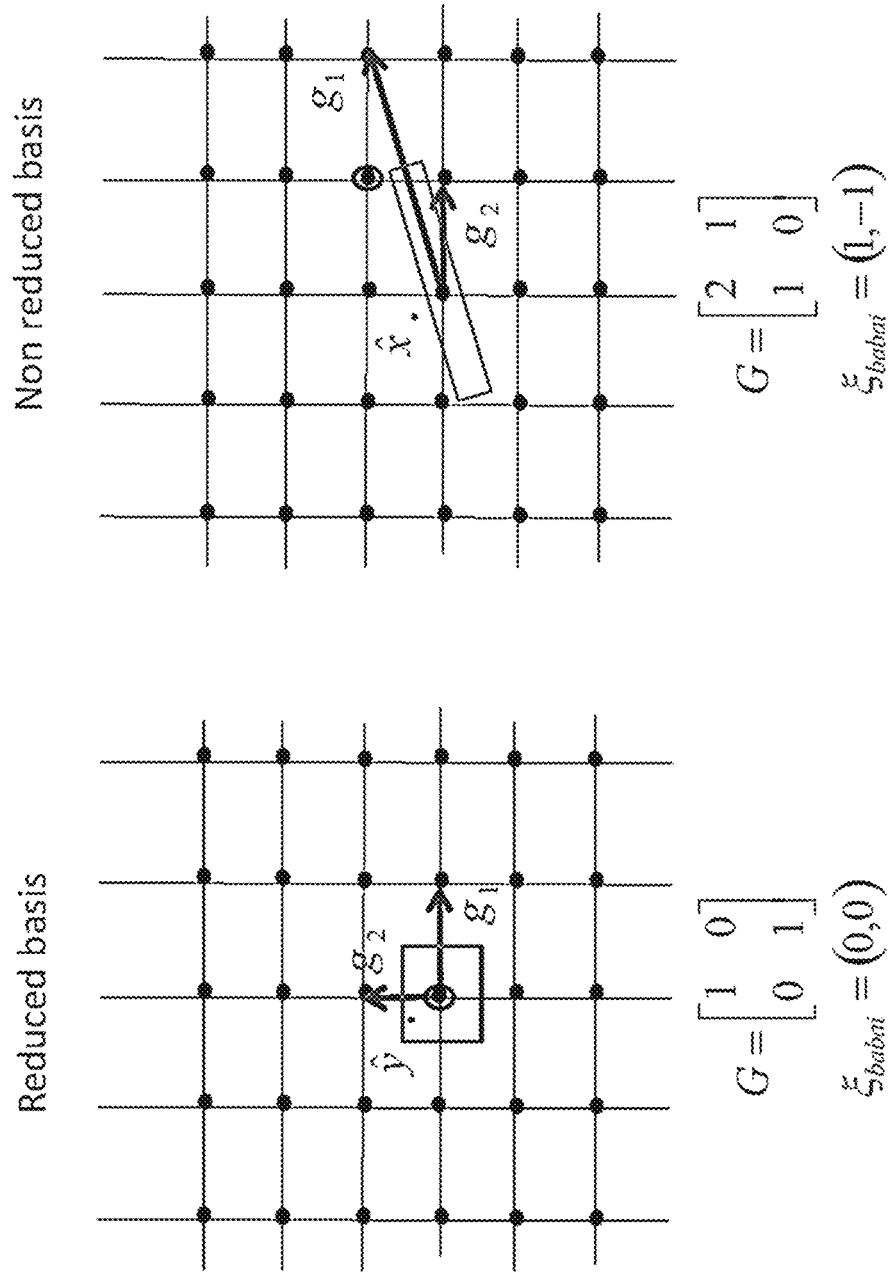
FIGS. 7A and 7B show examples of a Babai approximation with respect to a non-reduced basis and a reduced basis, respectively.

Change of basis. A change of basis of $\Upsilon$ is a based Hermitian lattice $\Upsilon'=(G', R)$ where $G'=G \circ T$ with T being an N×N matrix of determinant 1 with coefficients in the Gaussian ring $\mathbb{Z}$. The matrix T is called change of basis transition matrix. One can verify that the determinant condition ensures that the inverse matrix $T^{-1}$ has also integral coefficients. We give two examples change of basis of $\Upsilon_2=(I_2, R_2)$. The first is called unipotent change of basis (see FIG. 4) and is realized by transition matrix of the form:

$$T_a = \begin{bmatrix} 1 & a \\ 0 & 1 \end{bmatrix}, \qquad (2.9)$$

where $a \in \mathbb{Z}_i$. The second change of basis is called a flip (see FIG. 5) and it is realized by the transition matrix:

$$T_{flip} = \begin{bmatrix} 0 & 1 \\ -1 & 0 \end{bmatrix}, \qquad (2.10)$$

In fact, one can show that every unimodular integral matrix T, det T=1, is a finite composition of flips and unipotent transition matrices. This will become important when we discuss algorithms for computing reduced bases.

Change of coordinates. A change of coordinates of $\Upsilon$ is a based Hermitian lattice $\Upsilon'=(G', R')$ where $G'=A \circ G$ and $R'=A^{-H}RA^{-1}$ with A being an N×N invertible matrix. The matrix A is called change of coordinates transition matrix. The matrix A defines an isometry between the Euclidean metrics R and R', that is:

$$R'(Ax, Ay) = R(x, y), \qquad (2.11)$$

for every $x, y \in \mathbb{C}^N$. There is a distinguished realization, called the upper triangular realization, where the basis matrix is upper triangular and the metric $R=I_N$.
The corresponding transition matrix is given by $A=UG^{-1}$, where U is the upper triangular factor in the Cholesky decomposition:

$$G^H R G = U^H U, \qquad (2.12)$$

Furthermore, it may be verified that:

$$\begin{aligned} G' &= AG = U, \\ R' &= A^{-H} R A^{-1} \\ &= U^{-H} G^H R G U^{-1} \\ &= I_N \end{aligned} \qquad (2.13)$$

LLL reduced basis. A based Hermitian matrix $\Upsilon=(G, R)$ is called LLL reduced (LLL stands for Lenstra-Lenstra-Lovász) if, roughly speaking, the vectors of the basis G are orthogonal with respect to the metric R, i.e., $R(g_i, g_j)=0$, for every $i \neq j$.

Dimension two. We denote by $P_1$ the orthogonal projection on the one dimensional subspace $V_1 = \mathbb{C} g_1$ and respectively by $P_1^\perp = I - P_1$ the orthogonal projection on the complement subspace. The formula of $P_1$ is given by:

$$P_1(x) = g_1 \frac{R(g_1, x)}{R(g_1, g_1)}, \qquad (2.14)$$

for every $x \in \mathbb{C}^2$.

Definition 1.1. We say that $\Upsilon$ is LLL reduced if it satisfies the following two conditions:

(1) Size reduction condition:

$$|\text{Re} R(g_1, g_2)| \leq \frac{1}{2} R(g_1, g_1) \qquad (2.15)$$

$$|\text{Im} R(g_1, g_2)| \leq \frac{1}{2} R(g_1, g_1)$$

(2) Well ordering condition:

$$R(g_1, g_1) \leq R(g_2, g_2) \qquad (2.16)$$

The main statement in the two-dimensional theory is summarized in the following theorem:

Theorem 1.2 (Reduction theorem). If $g_1, g_2$ is LLL reduced basis then:

(1) The vector $g_1$ satisfies:

$$\sqrt{R(g_1, g_1)} \leq c \sqrt{R(\lambda_{short}, \lambda_{short})},$$

where $c = 1/2\sqrt{2} - \sqrt{2}$ and $\lambda_{short}$ denotes the shortest non-zero vector in $\Lambda$.

(2) The vector $g_2$ satisfies:

$$\sqrt{R(P_1^\perp g_2, g_2)} \leq \sqrt{R(P_1^\perp \lambda, \lambda)},$$

for every vector $\lambda \in \Lambda$ with non-zero orthogonal projection on $V_1^\perp$.

In words, Theorem 1.2 asserts that the first basis vector $g_1$ is no longer than a scalar multiple of the shortest non-zero vector in the lattice where the scalar is universal (does not depend on the lattice) and that the second basis vector is the shortest non-zero vector mod $g_1$.

General dimension. Assuming $\Upsilon$ is of rank N, we denote by $V_n$ the subspace spanned by the first n basis vectors, i.e., $V_n = \mathbb{C} \langle g_1, g_2, \ldots g_n \rangle$. We take the convention $V_0 = \{0\}$. The collection of subspaces $V_n$, $n=0, \ldots, N$ form a complete flag:

$$0 = V_0 \subset V_1 \subset \ldots \subset V_n = \mathbb{C}^N. \qquad (2.17)$$

We denote by $P_n$ the orthogonal projection (with respect to R) on the subspace $V_n$. Respectively, we denote by $P_n^\perp = I - P_n$ the orthogonal projection on the orthogonal complement subspace.

Definition 1.3. We say that (G, R) is LLL reduced if it satisfies the following two conditions:
(1) Size reduction condition:

$$|\text{Re} R(P_{n-1}^\perp g_n, g_m)| \leq \frac{1}{2} R(P_{n-1}^\perp g_n, g_n)$$

$$|\text{Im} R(P_{n-1}^\perp g_n, g_m)| \leq \frac{1}{2} R(P_{n-1}^\perp g_n, g_n),$$

for every n=1, . . . , N'1 and m>n.
(2) Well ordering condition:

$$R(P_{n-1}^\perp g_n, g_n) \leq R(P_{n-1}^\perp g_{n+1}, g_{n+1}),$$

forever n=1, . . . , N−1.

When G is upper triangular and R=I, the LLL conditions take a particularly simple form. The size reduction condition takes the form:

$$|\text{Re} g_{nm}| \leq \frac{1}{2} g_{nn}$$

$$|\text{Im} g_{nm}| \leq \frac{1}{2} g_{nn},$$

for every n=1, . . . , N−1 and m>n. The ordering condition takes the form:

$$|g_{nn}|^2 \leq |g_{n,n+1}|^2 + |g_{n+1,n+1}|^2.$$

2.2 Hard/Soft Detection Problem

In this section, a delay Doppler convolution channel model is assumed:

$$y = h * x + w, \quad (2.18)$$

where $x[\tau, v] \in \mathbb{C}^N$, $y[\tau, v] \in \mathbb{C}^M$, $h[\tau, v] \in \mathbb{C}^{M \times N}$ and w is the noise term. We assume that the input variables $x[\tau, v]$ are independent random variables, taking values in a QAM constellation set $\Omega \subset \mathbb{C}^N$, $\#\Omega = 2^{NQ}$.

Our ultimate goal is to calculate the finite a-posteriori probability distribution. Since this is formidable problem we approximate the prior probability distribution of $x[\tau, v]$ by a circular symmetric Gaussian distribution $\mathcal{CN}(\bar{x}[\tau, v], R_{x[\tau,v]})$. We denote by $\hat{x}^s = \hat{x}^s[\tau, v]$ the MMSE estimation of the MIMO symbol $x = x[\tau, v]$. The random variables and x are related through the backward and scaling equations:

$$x = \hat{x}^s + e, \quad (2.19)$$

$$\hat{x}^s = Ax + (1-A)\bar{x} + x, \quad (2.20)$$

where $e \perp \hat{x}^s$ and $z \perp x$. Furthermore, the parameters of the above equation related through:

$$A = I - R_e R_x^{-1}, \quad (2.21)$$

$$R_x = AR_e.$$

The MMSE variable $\hat{x}^s$ establishes a sufficient statistics for x, moreover the a-posteriori probability distribution is given by:

$$P(x | \hat{x}^s) \propto \exp(-R_e^{-1}\{\hat{x}^s - x, \hat{x}^s - x\}). \quad (2.22)$$

Roughly speaking, we wish to find a small subset of $\Omega$ that faithfully represents (2.22). We refer to this problem as the soft MAP detection problem. The expression in the exponent of (2.22) suggests to define the solution in geometric terms using the Euclidean metric $R = R_e^{-1}$. To this end, we introduce the following notion:

Definition 2.1. An $\Omega$-ball of size K around the point $\hat{x}^s$ where $K \in \mathbb{N}^{\geq 1}$ is the finite set:

$$B_K(\hat{x}^s, R, \Omega) = B_{r(K)}(\hat{x}^s, R) \cap \Omega, \quad (2.23)$$

where r(K) the maximum radius such that $|B_r(\hat{x}^s, R) \cap \Omega| \leq K$.

In plain language, (2.23) is the ball of maximum radius around $\hat{x}^s$ that contains at most K constellation points. In particular, when K=1 the ball consists of one element $\hat{x}^h$ called the MAP detector, defined by:

$$\hat{x}^h = \text{argmin}\{\|\hat{x}^s - x\|_R : x \in \Omega\}. \quad (2.24)$$

The soft MAP detection problem is formulated as the problem of calculating the $\Omega$-ball of size K for various choices of the parameter K. Note that (2.23) gives a precise mathematical definition of an optimal list of size K that approximates the a-posteriori probability distribution. In some embodiments, as the size of the list gets larger, the corresponding approximation gets better.

Extrinsic a-posteriori bit probabilities (LLR computation). Let L: $\Omega \to \mathbb{R}^{\geq 0}$ denote the total MIMO likelihood function defined through the scaling equation (2.20) as:

$$L(x) \propto \exp(-\|\hat{x}^s - (Ax + (1-A)\bar{x})\|_R^2), \quad (2.25)$$

for every $x \in \Omega$. Let $b_i^n$ denote the ith bit of the nth MIMO symbol where n=1, . . . , N and i=1, . . . , Q. Let $P_i^n: \{0, 1\} \to \mathbb{R}^{\geq 0}$ denote the prior probability distribution on the (i, n) bit. One can verify that the (exact) extrinsic a-posteriori probability on the (i, n) bit is given by:

$$E_i^n(b) = \sum_{b: b_i^n = b} L(x = m(b)) \prod_{(j,m) \neq (i,n)} P_j^m(b_j^m), \quad (2.26)$$

where m: $\{0, 1\}^{QN} \to \Omega$ is the total mapping rule, converting between bits and constellation vectors.

Typically, in formula (2.26), the summation over all elements $b \in \{0, 1\}^{QN-1}$ is intractable for large values of N or/and Q. Instead, using the list $\mathcal{L}$ we can define the approximated likelihood function:

$$\tilde{L}(x) = \begin{cases} L(x) & x \in B_K(\hat{x}^s, R, \Omega) \\ 0 & x \notin B_K(\hat{x}^s, R, \Omega) \end{cases}. \quad (2.27)$$

Using this approximation, define the approximated extrinsic probability distribution by:

$$\bar{E}_i^n(b) = \sum_{b:b_i^n=b} L(x=m(b)) \prod_{(j,m)\neq(i,n)} P_j^m(b_j^m). \quad (2.28)$$

The summation in (2.28) is over a much smaller set of size≤K. In order for (2.28) to be well posed, the set $B_K(\hat{x}^s, R, \Omega)$ should satisfy a mild technical requirement that for every (i, n) and bit value $b \in \{0, 1\}$ there exists a vector $b \in \{0, 1\}^{QN}$ such that:

$$b_i^n = b \quad (2.29)$$
$$m(b) \in B_K(\hat{x}^s, R, \Omega).$$

2.3 Examples of Lattice Relaxation

In some embodiments, computing (2.23) may be difficult since the search space $\Omega$ grows exponentially with the MIMO dimension N and the constellation order Q. This difficulty increases when the Euclidean metric R is highly correlated. One example of reducing complexity of the search problem is to embed $\Omega$ inside a bigger set that is better behaved (and is generally referred to as problem relaxation).

One way to do that is to embed $\Omega$ as subset of an infinite (shifted) lattice. Let $\Lambda = \mathbb{Z}_i^N$ denote the standard Gaussian lattice of rank N. Let $v_0 = (1+i)/2 \cdot 1$ where $1 = (1, 1, \ldots, 1)$. One can easily verify that when Q is even, we have:

$$\Omega \subset \Lambda + v_0 \quad (2.30)$$

We equip $\Lambda$ with the based Hermitian lattice structure $\Upsilon = (G, R)$ where $G = I_N$. We define $\hat{x} = \hat{x}^s - v_0$. We consider discrete balls centered at the point $\hat{x}$ parametrized either by their radius or their size: given a positive real number r>0, we define the $\Upsilon$-ball of radius r around $\hat{x}$ as the set:

$$B_r(\hat{x}, \Upsilon) = \{\xi \in \mathbb{Z}_i^N : \|\hat{x} - G(\xi)\|_R < r\}. \quad (2.31)$$

In words, the set (2.31) consists of all lattice points inside a ball or radius r around the point $\hat{x}$ or, more precisely, the coordinates of these points with respect to the standard basis.

Given a positive integer $K \in \mathbb{N}^{\geq 1}$, we define the $\Upsilon$-ball of size K around $\hat{x}$ as the set:

$$B_K(\hat{x}, \Upsilon) = B_{r(K)}(\hat{x}, \Upsilon), \quad (2.32)$$

where (K) the maximum radius such that $|B_r(\hat{x}, \Upsilon)| \leq K$, i.e.,:

$$r(K) = \max\{r : |B_r(\hat{x}, \Upsilon)| \leq K\} \quad (2.33)$$

In words, the set (2.32) is the $\Upsilon$-ball of maximum radius that contains at most K points. In some embodiments, the relation $B_K(\hat{x}^s, R, \Omega) = B_K(\hat{x}, \Upsilon) + v_0$ available. The solution of the soft lattice detection problem may be defined to be the ball $B_K(\hat{x}, \Upsilon)$ for various choices of the parameter K. One benefit, amongst others, in replacing (2.23) by (2.32) is that based Hermitian lattices (unlike constellation sets) admit a multitude of isomorphic realizations (or images). This advantageously enables a convenient realization for $\Upsilon$ to be chosen for computing (2.32), and this flexibility is one reason the lattice relaxation approach is employed.

2.4 Example of an Approximate Solution for Soft Lattice Detection

In some embodiments, an approximate solution of the soft lattice detection problem may be implemented efficiently. For example, the construction may use an LLL reduced upper triangular realization of the based Hermitian lattice $\Upsilon$, which is denoted as $\Upsilon_{LR}$.

That is, $\Upsilon_{LR} = (U, I_N)$ where $U = (u_{nm})$ is an upper triangular matrix size reduced and well ordered. We further assume that we are given a change of basis T and a change of coordinates A such that $U = A \circ G \circ T$ and $I_N = A^{-H} \circ R \circ A^{-1}$. We construct an approximation of the ball $B_K(\hat{y}, \Upsilon_{LR})$, where $\hat{y} = A\hat{x}$ and than derive an approximation of the ball $B_K(\hat{x}, \Upsilon)$ through the relation:

$$B_K(\hat{x}, \Upsilon) = T(B_K(\hat{y}, \Upsilon_{LR})) \quad (2.34)$$

We introduce a one parametric family of probability distributions on $\mathbb{Z}_i^N$. For any positive real number a>0 we define a probability distribution $P_a: \mathbb{Z}_i^N \to \mathbb{R}^{\geq 0}$ expressed as multiplication of one dimensional conditional probability distributions, i.e.,:

$$P_a(\xi) = \prod_{n=1}^{N} P_a(\xi[n] \mid \xi[n+1:N]), \quad (2.35)$$

for every $\xi = (\xi[1], \xi[2] \ldots \xi[N]) \in \mathbb{Z}_i^N$. The nth conditional probability is given by:

$$P_a(\xi[n] = z \mid \xi[n+1:N]) = \frac{1}{s_n(\xi[n+1:N])} \exp(-a|\hat{y}_n - u_{nn}z|^2), \quad (2.36)$$

where $$\hat{y}_n = \hat{y}[n] - \sum_{m=n+1}^{N} \xi[m]u_{nm} \quad (2.37)$$

$$s_n(\xi(n+1:N]) = \sum_{z \in \mathbb{Z}_i} \exp(-a|\hat{y}_n - u_{n,n} \cdot z|^2).$$

We note that $s_n(\xi[n+1:N])$ is merely the normalization factor to ensure that the total probability is equal 1. Moreover, the complex number $\hat{y}_n$ has geometric meaning: to explain it, we denote by $P_n$ the orthogonal projection on the subspace $V_n$—spanned by the basis vectors $u_1, \ldots, u_n$ which by the upper triangular structure coincides with the standard coordinate n dimensional subspace $V_n = \{x : x[n+1:N] = 0\}$. We have:

$$\hat{y}_n e_n = P_{n-1}^\perp P_n \left( \hat{y} - \sum_{n+1}^N \xi[m] u_m \right). \tag{2.38}$$

To get some intuition for the construction it, is worthwhile to consider the limiting case when $a \to \infty$. One can see, that in the limit the nth conditional probability collapses to a deterministic delta supported at the element $\xi_{babai}[n] = \lceil y_n / u_{nn} \rfloor$ where $\lceil z \rfloor \in \mathbb{Z}_i$ denotes rounding to the closest Gaussian integer to z. The vector $\xi_{babai} = (\xi_{babai}[1], \ldots, \xi_{babai}[N])$ is called the Babai lattice point and it can be interpreted as the solution of a successive cancellation detector. Fixing the value of the parameter K, we define the set:

$$B_K(a) = \{\xi: P_a(\xi) \geq 1/K\}. \tag{2.39}$$

In words, the set $B_K(a)$ consists of all points $\xi \in \mathbb{Z}_i^N$ whose probability is $\geq 1/K$. Evidently, the number of elements in $B_K(a)$ is $\leq K$ since the total probability is equal 1. The upshot is that. $B_K(a)$ is a good approximation of the ball $B_K(\hat{y}, \Upsilon_{LR})$ if the parameter a is chosen appropriately. The main technical statement is that the set $B_K(a)$ contains a $\Upsilon_{LR}$-ball of certain radius r which of course depends on the value of a and K. The precise statement is summarized in the following lemma:

Lemma 4.1 (Technical Lemma). We have $B_r(\hat{y}, \Upsilon_{LR}) \subset B_K(a)$ where $r = r(a, K)$ is given by:

$$r(a, K)^2 = \min_m |u_{mm}|^2 \left( \frac{\ln(K)}{\ln(\rho)} - \frac{4N}{\rho \ln(\rho)} \right), \tag{2.40}$$

with $a = \ln(\rho)/\min_m |u_{mm}|^2$.

Granting the validity of Lemma 4.1, it is natural to ask, for a given value of K, what is the optimal value of the parameter $\rho$ that maximizes the radius r (a, K).

Denoting by $f(\rho)$ the expression on the right hand side of (2.40) and equating the derivative $f'(\rho_0) = 0$, it may be verified that $\rho_0$ and K are related through:

$$K = (e\rho_0)^{4N/\rho_0}. \tag{2.41}$$

Substituting $\rho_0$ back in f we get the following formula for the optimal radius:

$$r(K)^2 = \min_m |u_{mm}|^2 \left( \frac{4N}{\rho_0} \frac{\ln(\rho_0) + 1}{\ln(\rho_0)} - \frac{4N}{\rho_0 \ln(\rho_0)} \right) \tag{2.42}$$

$$= \frac{4N}{\rho_0} \min_m |u_{mm}|^2.$$

To put things in order, it is convenient to introduce an additional parameter: for a given radius $r > 0$, we define:

$$G(r) = \frac{4r^2}{\min_m |u_{mm}|^2}. \tag{2.43}$$

To explain the meaning of this parameter we note that the expression $\frac{1}{2} \min_m |u_{mm}|$ is the Babai radius, that is if $\|\hat{y} - U\xi^\star\| \leq \frac{1}{2} \min_m |u_{mm}|$ then $\xi_{babai} = \xi^\star$ where $\xi^\star$ is the closest lattice point to $\hat{y}$. Granting this fact, G(r) can be interpreted as the radial gain of r over the Babai radius. For example if G(r)=2, we say r has 3 dB gain over the Babai radius. In practice, it is natural to fix the gain G and to ask for the value of the parameter K such that $4 \cdot r(K)^2 / \min_m |u_{mm}|^2 = G$.

Using the expression in (2.42), and the definition in (2.43), we can derive:

$$G = 4 \cdot r(K)^2 / \min_m |u_{mm}|^2$$

$$= \frac{16N}{\rho_0},$$

This implies that $\rho_0 = 16N/G$. Hence, using (2.41), we get:

$$K = (16Ne/G)^{G/4} \tag{2.44}$$

From formula (2.44), the size parameter K as a function of the radial gain can be seen to grow as $O(N^{G/4})$ with the MIMO order, and thus, to realize larger gains, larger list sizes may be employed. For example, to get a radial gain of 3 dB, we use $K = \sqrt{8eN}$ and $\rho_0 = 8N$.

2.5 Exemplary Deformation of the Sphere Decoder

In this section we describe a deformation of the standard sphere decoder that is specifically adapted to computing the set $B_K(a)$. For the rest of this section we fix the value of the parameters K and a. Next we introduce some basic terminology related to the underlying combinatorics of sphere decoding.

Figure 8:
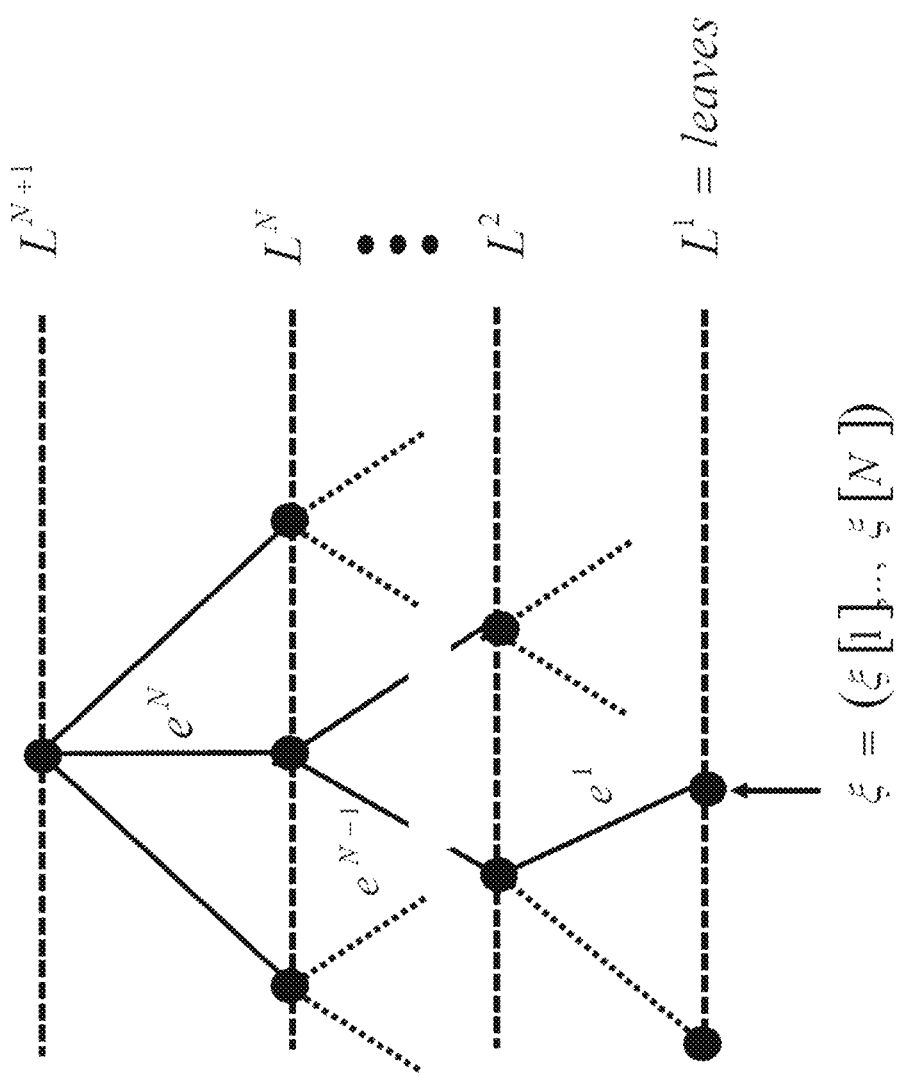
FIG. 8 shows an example of a sphere decoding combinatorial tree.

FIG. 8 shows an exemplary definition of a layered directed tree structure on the standard lattice $\mathbb{Z}_i^N$. The tree consists of N+1 levels.

For every number $n = 1, \ldots, N+1$, we denote the nth level by $L^n$ and it consists of elements $\xi \in \mathbb{Z}_i^N$ such that $\xi[m] = 0$ for every $m < n$. In particular, the level $L^{N+1}$ consists of one element which is the zero vector, called the root of the tree; on the other extreme, the level $L^1$ is equal $\mathbb{Z}_i^N$ and its elements are called leaves. The edges connect vertices in $L^{n+1}$ with vertices in $L^n$: given a pair of elements $\xi^{n+1} \in L^{n+1}$ and $\xi^n \in L^n$, the ordered pair $(\xi^{n+1}, \xi^n)$ is an edge if $\xi^n[m] = \xi^{n+1}[m]$ for every $m \geq n+1$.

Formula (2.36) may be used to introduce weights on the edges. For example, given an edge $e^n = (\xi^{n+1}, \xi^n)$, its weight may be defined as:

$$w(e) = -\ln P_a(\xi^n[n] \mid \xi^{n+1}) \tag{2.45}$$

$$= a|\hat{y}_n - u_{nn}\xi^n[n]|^2 + \ln s_n(\xi^{n+1}).$$

It may be observed that a leaf $\xi \in L^1$ belongs to the set $B_K(a)$ if and only if:

$$\sum_{n=N}^{1} w(e^n) \leq \ln(K), \tag{2.46}$$

Here $e^N, e^{N-1}, \ldots, e^1$ are the edges along the unique branch leading from the root to the leaf $\xi$. Note that substituting a=1 in (2.45) and omitting the affine term ln $s_n(\xi^{n+1})$, we get the weights used by the conventional sphere decoder. In this regard, the new weights may be interpreted as a deformation of the sphere decoder structure. In some embodiments, and based on this weighted tree structure, the algorithm for computing the set $B_K(a)$ proceeds as a depth first search algorithm along the vertices of the weighted tree.

2.6 Examples of Lattice Reduction Algorithm in Two Dimensions

Reduction algorithm—invariant form. The algorithm accepts as input a basis matrix G and produces as output an LLL reduced basis matrix G' such that G'=G∘T, where $T \in SL_2(\mathbb{Z}_i)$. Specifically, the algorithm constructs a sequence:

$$G = G^0, G^1, \ldots, G^K = G', \qquad (2.47)$$

such that $G^{k+1}=G^k \circ T^k$ where $T^k \in SL_2(\mathbb{Z}_i)$. Consequently, we have $T = T_0 \circ T_1 \circ \ldots \circ T_{K-1}$.

The sequence (2.47) is constructed via alternating between the two basic transformations.

(1) Size reduction transformation. Reduce the size of the second basis vector with respect to the first basis vector according to the rule $g_2^{k+1}=g_2^k - a \cdot g_1^k$ where:

$$a = \left\lceil \frac{R(g_1^k, g_2^k)}{R(g_1^k, g_1^k)} \right\rfloor,$$

This transformation is realized by the unimodular matrix.

$$T^k = \begin{bmatrix} 1 & -a \\ 0 & 1 \end{bmatrix},$$

(2) Flipping transformation. Interchange the basis vectors according to the rule $g_1^{k+1}=-g_2^k$ and $g_2^{k+1}=g_1^k$. This transformation is realized by the unimodular matrix:

$$T^k = \begin{bmatrix} 0 & 1 \\ -1 & 0 \end{bmatrix},$$

Reduction algorithm—upper triangular form. We describe a version of the LLL reduction algorithm which is adapted to the upper-triangular realization. The algorithm accepts as input an upper-triangular basis matrix U and produces as output an LLL reduced basis matrix U' such that U'=A∘U∘T where $T \in SL_2(\mathbb{Z}_i)$ and $A \in U(\mathbb{C}^2)$. Specifically, the algorithm constructs a sequence of upper triangular matrices:

$$U=U^0, U^1, \ldots, U^K = U', \qquad (2.48)$$

such that $U^{k+1}=A^k \circ G^k \circ T^k$ where $T^k \in L_s(\mathbb{Z}_i)$ and $A^k \in U(\mathbb{C}^2)$ (Unitary matrix. Consequently, we have $T = T_0 \circ T_1 \circ \ldots \circ T_{K-1}$ and $A = A_{K-1} \circ \ldots \circ A_2 \circ A_1$. In what follows, we use the notation for $u_{ij}^k$ for the (i, j) coordinate of the matrix $U^k$ and denote by $u_n^k = U^k(:, n)$ the nth vector of the kth basis.

The sequence of generators in (2.48) is constructed by alternating between the following two types of transformations.

(1) Size reduction transformation. Reduce the size of the second basis vector with respect to the first basis vector according to the rule $u_2^{k+1}=u_2^k - a u_1^k$ where:

$$a = \left\lceil \frac{\langle u_1^k, u_2^k \rangle}{\langle u_1^k, u_1^k \rangle} \right\rfloor = \left\lceil \frac{u_{12}^k}{u_{11}^k} \right\rfloor,$$

This transformation is realized by the unimodular matrix:

$$T^k = \begin{bmatrix} 1 & -a \\ 0 & 1 \end{bmatrix}.$$

(2) Flipping transformation. The basis vectors are flipped according to the rule $g_2^{k+1}=-u_1^k$ and $g_1^{k+1}=u_2^k$. This change of basis is realized by the unimodular matrix:

$$T^k = \begin{bmatrix} 0 & 1 \\ -1 & 0 \end{bmatrix},$$

The resulting matrix $G^{k+1}=U^k \circ T^k$ is lower triangular and is transformed back to upper triangular form by change of realization $A^k=Q$, where Q is the Unitary factor in the QR decomposition of $G^{k+1}$. Alternatively, $U^{k+1}=U$—the upper triangular multiplier in the Cholesky decomposition $G^{k+1H}G^{k+1}=U^H U$.

Convergence of the algorithm. The convergence of the reduction algorithm can be proved by energy considerations. We define the energy functional:

$$E(G)=R(g_1,g_1)^2 R(P_1^\perp g_2, g_2).$$

Considering the sequence in (2.47), we have the following theorem: Theorem 6.1. The following inequality always hold:

$$E(G^{k+1}) \leq E(G^k),$$

moreover, when $G^k$ is flipped we have $E(G^{k+1}) \leq \alpha E(G^k)$ for some $\alpha < 1$.

2.7 Examples of Lattice Reduction Algorithm in Higher Dimensions

Reduction algorithm—invariant form. The invariant LLL reduction algorithm accepts as input a basis matrix G and produces as output an LLL reduced basis matrix G' such that G'=G∘T where $T \in SL_N(\mathbb{Z}_i)$. Specifically, the algorithm constructs a sequence:

$$G = G^0, G^1, \ldots, G^K = G', \qquad (2.49)$$

such that $G^{k+1}=G^k \circ T^k$, $T^k \in SL_N(\mathbb{Z}_i)$. Consequently, we have $T = T_0 \circ T_1 \circ \ldots \circ T_{K-1}$.

The sequence (2.49) is constructed using two types of change of basis transformations.

(1) Size reduction transformation. Let m>n∈[1, N]. Reduce the size of the jth basis vector with respect to the ith basis vector according to the rule $g_m^{k+1}=g_m^k - a g_n^k$ where:

$$a = \left\lceil \frac{R(P_{n-1}^\perp g_n^k, g_m^k)}{R(P_{n-1}^\perp g_n^k, g_n^k)} \right\rfloor,$$

Here [−] stands for the closest Gaussian integer. This transformation, is realized by the unimodular matrix:

$$T^k = \begin{bmatrix} 1 & . & 0 & 0 & . & 0 \\ . & . & 0 & 0 & 0 & 0 \\ 0 & 0 & 1 & . & -a & 0 \\ 0 & 0 & 0 & . & . & 0 \\ . & 0 & 0 & 0 & 1 & . \\ 0 & 0 & 0 & 0 & . & 1 \end{bmatrix},$$

i.e., the unit matrix with additional non-zero entry $T^k(n, m) = -a$.

(2) Flipping transformation. Let $n \in [1, N-1]$. Interchange the nth and the n+1th basis vectors according to the rule $g_n^{k+1} = -g_{n+1}^k$ and $g_{n+1}^{k+1} = g_n^k$. This transformation is realized by the unimodular matrix:

$$T^k = \begin{bmatrix} 1 & . & 0 & 0 & . & 0 \\ . & . & 0 & 0 & 0 & 0 \\ 0 & 0 & 0 & 1 & 0 & 0 \\ 0 & 0 & -1 & 0 & 0 & 0 \\ . & 0 & 0 & 0 & . & . \\ 0 & 0 & 0 & 0 & . & 1 \end{bmatrix},$$

i.e., the unit matrix except that $$T^k(n{:}n+1, n{:}n+1) = \begin{bmatrix} 0 & 1 \\ -1 & 0 \end{bmatrix}.$$

Remark. The algorithm applies the size reduction step only if the size reduction condition is not satisfied and applies the flipping transformation always after applying size reduction transformation and only if the well ordering condition is not satisfied.

Reduction algorithm—upper triangular form. The upper triangular version of the LLL reduction algorithm accepts as input an upper triangular basis matrix U and produces as output an LLL reduced upper triangular basis matrix U' such that U'=A∘U∘T where $T \in SL_N(\mathbb{Z}_i)$ and $A \in U(\mathbb{C}^N)$. In more details, the algorithm constructs a sequence of upper triangular matrices:

$$U^0 = U, U^1, \ldots, U^K = U', \qquad (2.50)$$

such that $U^{k+1} = A^k \circ U^k \circ T^k$ where $T^k \in SL_N(\mathbb{Z}_i)$ and $A^k \in U(\mathbb{C}^N)$. Consequently, $T = T^0 \circ T^2 \circ \ldots \circ T^{K-1}$ and let $A = A^0 \circ A^2 \circ \ldots \circ A^{K-1}$. In what follows, we use the notation $u_{ij}^k$ fro the (i, j) coordinate of the matrix $U^k$ and denote by $u_n^k = U^k(:, n)$ the nth vector of the kth basis.

The sequence (2.50) is constructed using two types of transformations, each being a combination of a change of basis with a change of realization.

(1) Size reduction transformation. For m>n, reduce the size of the mth basis vector $u_m$ with respect to the nth basis vector $u_n$ according to the rule $u_m^{k+1} = u_m^k - au_n^k$ where:

$$a = \left[ \frac{\langle P_{n-1}^\perp u_n^k, u_m^k \rangle}{\langle P_{n-1}^\perp u_n^k, u_n^k \rangle} \right] = \left[ \frac{u_{nm}^k}{u_{nn}^k} \right].$$

This is realized by the unimodular matrix:

$$T^k = \begin{bmatrix} 1 & . & 0 & 0 & . & 0 \\ . & . & 0 & 0 & 0 & 0 \\ 0 & 0 & 1 & . & -a & 0 \\ 0 & 0 & 0 & . & . & 0 \\ . & 0 & 0 & 0 & 1 & . \\ 0 & 0 & 0 & 0 & . & 1 \end{bmatrix},$$

i.e., the unit matrix with additional non-zero entry $T^k(n, m) = -a$. To conclude:

$$U^{k+1} = U^k \circ T^k,$$

Note that the upper triangular size reduction transformation has the same form as its invariant counterpart since $U^k \circ T^k$ is already in upper triangular form.

(2) Flipping transformation. For n=1, ..., N−1, interchange between the nth and the n+1th basis vectors according to the rule $g_n^{k+1} = -u_{n+1}^k$ and $g_{n+1}^{k+1} = u_n^k$ followed by a change of realization to return to upper triangular form. The change of basis matrix is given by:

$$T^k = \begin{bmatrix} 1 & . & 0 & 0 & . & 0 \\ . & . & 0 & 0 & 0 & 0 \\ 0 & 0 & 0 & 1 & 0 & 0 \\ 0 & 0 & -1 & 0 & 0 & 0 \\ . & 0 & 0 & 0 & . & . \\ 0 & 0 & 0 & 0 & . & 1 \end{bmatrix}.$$

The change of realization matrix is defined as follows. Let $G^{k+1} = U^k \circ T^k$. One can verify that $G^{k+1}$ is almost upper triangular except that $L = G^{k+1}(n{:}n+1, n{:}n+1)$ is lower triangular. Let L=QR be the Q-R decomposition of L where Q is unitary and R upper triangular. We define:

$$A^k = \begin{bmatrix} 1 & . & 0 & 0 & . & 0 \\ . & . & 0 & 0 & 0 & 0 \\ 0 & 0 & q_{11} & q_{12} & 0 & 0 \\ 0 & 0 & q_{21} & q_{22} & 0 & 0 \\ . & 0 & 0 & 0 & . & . \\ 0 & 0 & 0 & 0 & . & 1 \end{bmatrix},$$

i.e., $A^k$ is the unit matrix except that $A^k(n{:}n+1, n{:}n+1) = Q$. To conclude: $U^{k+1} = A^k \circ U^k \circ T^k$. Alternatively, we can define $U^{k+1} = G^k$ except that $U^{k+1}(n{:}n+1, n{:}n+1) = U$ where U is the upper triangular factor in the Cholesky factorization $L^H L = U^H U$.

3 Exemplary Implementations for Lattice Detection/Reduction

Typical constellations like QAM vectors can be naturally viewed as truncation of translated lattices in $\mathbb{C}^N$. This observation suggests the idea of relaxing the problem of finding the closest constellation point (aka CCP problem) to the problem of finding the closest corresponding lattice point (aka CLP problem) ignoring the truncation boundary conditions. One of the advantages of working with lattices over working with constellation sets is that lattices admit various bases and realizations. This freedom enables to device lower complexity detection algorithms. Two examples of such algorithms are the Heuristic Babai detector and the exact sphere detector. Both algorithms use a canonical weighted tree structure which is associated with the lattice.

3.1 Preliminaries from Linear Algebra

Euclidean Geometry

Hermitian vector spaces. Euclidean geometry over the complex numbers study Hermitian vector spaces.
Definition An Hermitian vector space is a pair (V, R) where V is a vector space over $\mathbb{C}$ and R: V×V→$\mathbb{C}$ is an Hermitian, product.
We follow the convention that the first variable is skew linear, that is:

$$R(\lambda v, \lambda' v') = \overline{\lambda} \lambda' R(v, v'),$$

for every v, v'∈v and λ, λ'∈$\mathbb{C}$. Hermitian products transform under linear maps. Given an Hermitian vector space (V, R) and a linear map A: U→v, one defines the pullback Hermitian product A*(R): U×U→$\mathbb{C}$ by the rule:

$$A^*(R)(u, u') = R(Au, Au'),$$

for every u, u'∈U. We note the relation with standard matrix definitions. When V=$\mathbb{C}^N$ the form R can be represented by an Hermitian matrix R so that:

$$R(x, y) = x^H R y,$$

for every x, y∈$\mathbb{C}^N$ where $x^H$ denotes the iron vector obtained as the complex conjugate of a column vector x. Moreover, if in addition U=$\mathbb{C}^M$ and A is an N×M matrix then:

$$A^*(R) = A^H R A.$$

where $A^H$ stands for the conjugate transpose of A. To conclude, one should view Hermitian vector spaces as the coordinate free counterpart of Hermitian matrices. In the sequel we use the notation:

$$R(v) = R(v, v),$$

for every v∈V. We also use the notation $R_0$: $\mathbb{C}^N \times \mathbb{C}^N \to \mathbb{C}$ for the standard Hermitian product:

$$R_0(x, y) = x^H y,$$

for every x, y∈$\mathbb{C}^N$.
Duality, Hermitian vector spaces admit duals. Given an Hermitian vector space (V, R) there exists a canonical Hermitian form on the dual vector space V*. To define it, let $\hat{R}$: V→V* denote the canonical skew linear map sending a vector v∈V to the linear functional $\hat{R}(v) \in V^*$ defined by:

$$\hat{R}(v)(v') = R(v, v'),$$

for every v'∈V. The map $\hat{R}$ is a bijection since R is non-degenerate. The dual Hermitian product $R^d$: V*×V*→$\mathbb{C}$ is characterized by the pullback equation:

$$\hat{R}^*(R^d) = R \Leftrightarrow R^d = \hat{R}^{-1*}(R). \quad (3.1)$$

Note that $R^d$ is skew linear in the second variable. Finally, we note the relation with standard matrix definitions. Assume V=$\mathbb{C}^N$. Let us denote by $R_0$ the standard inner product on $\mathbb{C}^N$. Assume that the Hermitian product R is represented by an Hermitian matrix:

$$R(x, y) = x^H R y,$$

for every x, y∈$\mathbb{C}^N$. Under these assumptions one can show that:

$$\hat{R}_0^*(R^d)(x, y) = x^H R^{-1} y, \quad (3.2)$$

for every x, y∈$\mathbb{C}^N$. In words, the pullback of $R^d$ under the map $\hat{R}_0$ is represented by the inverse of the matrix R.
Remark. There: is a nice interpretation of R and $R^d$ in the framework of probability theory. Under this interpretation, the form, R is the information matrix of a Gaussian random variable X∈V such that:

$$\mathbb{P}(X = x) \propto e^{-\frac{1}{2} R(x, x)}.$$

The dual form $R^d$ is the covariance matrix of X. One can show that:

$$R^d(\alpha, \beta) = \int_{x \in V} \alpha(x) \overline{\beta(x)} \mathbb{P}(X = x) dx,$$

for every pair of linear functionals α, β∈V*. In words, $R^d$ (α, β) is the covariance between any pair of scalar measurements of the random variable X. Note that in standard texts both R and $R^d$ are given by Hermitian matrices satisfying $R^d = R^{-1}$. This convention is not canonical and relies on the existence of another Hermitian form $R_0$ on V used to identify V and V*.

Orthogonal projection. Probably the most important notion in Euclidean geometry is that of orthogonal projection. Let (V, R) be a finite dimensional Hermitian vector space. Let U⊂V be a linear subspace. The orthogonal complement of U is denoted by $U^\perp$ and is defined as:

$$U^\perp = \{v \in V: R(v, u) = 0 \text{ for every } u \in U\}.$$

Every vector v∈V can be written in a unique manner as a sum:

$$v = P_U(v) + P_{U^\perp}(v),$$

where $P_U(v) \in U$ and $P_{U^\perp}(v) \in U^\perp$. The rule $v \mapsto P_U(v)$ gives a linear map $P_U$: V→V called the orthogonal projection on U. Similarly, the rule $v \mapsto P_{U^\perp}(v)$ gives a linear map $P_{U^\perp}$: V→V called the orthogonal projection on $U^\perp$. One can verify the following identities:

$$P_U + P_{U^\perp} = Id$$

$$P_U \circ P_U = P_U,$$

$$P_{U^\perp} \circ P_{U^\perp} = P_{U^\perp},$$

$$P_{U^\perp} \circ P_U = P_U \circ P_{U^\perp} = 0.$$

In words, $P_U$ and $P_{U^\perp}$ form an orthogonal decomposition of the identity. Interestingly, $P^U$ can be characterized by the geometric property:

$$P_U(v) = \arg\min_u \{R(v-u): u \in U\},$$

for every $v \in V$. In words, $P_U(v)$ is the vector in U that is the closest to v with respect to the Euclidean metric R.

Remark. The notion of orthogonality and hence the definition of orthogonal projection depends very strongly on the Hermitian structure R. Note that even when $V=\mathbb{C}^N$ and $U=\{(x_1, \ldots, x_K, 0, \ldots, 0): x_i \in \mathbb{C}\}$ is the standard coordinate subspace the orthogonal complement $U^\perp$ might look very different from $\{(0, \ldots, 0, x_{K+1}, \ldots, x_N): x_i \in \mathbb{C}\}$ unless the Hermitian product is the standard product:

$$R_0(x,y) = x^H y,$$

for every $x, y \in \mathbb{C}^N$.

Schur reduction. Let (V, R) be a finite dimensional Hermitian vector space. Let $U \subset V$ be a linear subspace. We define a degenerate Hermitian product $R_U: V \times V \to \mathbb{C}$ by:

$$R_U(v,v') = R(P_U v, v'). \tag{3.3}$$

The Hermitian product $R_U$ is called the Schur reduction of R to the subspace U. One can verify that $R_U(u, v) = 0$ for every $u \in U^\perp$ and $v \in V$ thus $R_U$ reduces to a non-degenerate Hermitian product on the quotient vector space $V/U^\perp$. Similarly, the Schur reduction with respect to $U^\perp$ is given by:

$$R_{U^\perp}(v, v') = R(P_{U^\perp} v, v')$$
$$= R(v, v') - R_U(v, v').$$

The Hermitian product $R_{U^\perp}$ is sometimes called the Schur complement of R with respect to U; it is a degenerate Hermitian form that reduces to a non-degenerate Hermitian form on the quotient space V/U.

We note the relation to standard matrix formulation. Assume $V = \mathbb{C}^N$ and $U = \{(x_1, \ldots, x_K, 0, \ldots, 0): x_i \in \mathbb{C}\}$. Assume R is represented by an N×N Hermitian matrix R of the form:

$$R = \begin{bmatrix} A & B \\ B^H & D \end{bmatrix},$$

where A, B and D are matrices of dimensions K×K, K×N−K and N−K×N−K respectively. We assume A is invertible. The Schur reductions of $R_U$ and $R_{U\perp}$ are represented respectively by the (singular) Hermitian matrices:

$$R_U = \begin{bmatrix} A & B \\ B^H & B^H A^{-1} B \end{bmatrix}, \tag{3.4}$$

$$R_{U^\perp} = \begin{bmatrix} 0 & 0 \\ 0 & D - B^H A^{-1} B \end{bmatrix}.$$

Based Hermitian lattices. Let $\mathbb{Z}_i = \mathbb{Z} \oplus i\mathbb{Z}$ be the ring of Gaussian integers where $i = \sqrt{-1}$. The main object of study in these notes is full rank lattices lying inside Hermitian vector spaces. Such objects lie at the intersection of lattice theory and Euclidean geometry. In fact, we will require in addition a choice of a particular basis of the lattice giving rise to the notion of a based Hermitian lattice.

Definition. A based Hermitian lattice over $\mathbb{Z}_i$ is a triple (Y, G, R) where:

V is a complex vector space of dimension N.

G is a linear isomorphism G: $\mathbb{C}^N \xrightarrow{\simeq} V$.

R is an Hermitian product R: $V \times V \to \mathbb{C}$.

A based Hermitian lattice (V, G, R) defines in particular a lattice $\Lambda = G(\mathbb{Z}_i^N)$. Elements of $\Lambda$ are $\mathbb{Z}_i$ linear combinations of the vectors $\lambda_i = G(e_i)$ where $e_i$ is the standard ith basis vector of $\mathbb{C}^N$, that is:

$$\Lambda = \{a[1]\lambda_1 + \ldots + a[N]\lambda_N: a[k] \in \mathbb{Z}_i\}.$$

The vectors $\lambda_1, \ldots, \lambda_n \in V$ form a basis of $\Lambda$. The map C is called the generator of $\Lambda$. The Hermitian vector space (V, R) is called the realization space of $\Lambda$.

Remark. A based Hermitian lattice is a full rank lattice in an Hermitian vector space equipped with a specific choice of basis.

Two basic operations on based Hermitian lattices include:

1. Change of basis. Changing the basis of a based Hermitian lattice amounts to changing the generator matrix G. Let $SL_N(\mathbb{Z}_i)$ denote the group of Gaussian unimodular N×N matrices, that is, the set consisting of N×N matrices of determinant 1 with coefficients in the ring $\mathbb{Z}_i$ equipped with the operation of matrix multiplication (it can be shown that the inverse of a unimodular matrix is also unimodular).

Definition. A change of basis of a based Hermitian lattice (V, G, R) is a based Hermitian lattice of the form (V, G', R) where $G' = G \circ T$ for some $T \in SL_N(\mathbb{Z}_i)$.

2. Change of realization. Changing the realization of a based Hermitian lattice amounts to changing the realization space (V, R).

Definition. A change of realization of a based Hermitian lattice (V, G, R) is a based Hermitian lattice (V', G', R') where $G' = A \circ G$ and $R = A^*(R')$ for some isomorphism A: $V \xrightarrow{\simeq} V'$.

Note that if $V = V' = \mathbb{C}^N$ then the forms R and R' can be represented by Hermitian matrices and the pullback equation $R = A^*(R')$ translates to the conjugation condition:

$$R = A^H R' A.$$

Triangular realizations. Let (V, G, R) be a based Hermitian lattice. There exists two special realizations. An upper triangular realization ($\mathbb{C}^N$, U, $R_0$) where U is an upper triangular matrix. The generator U is defined by the upper Cholesky decomposition:

$$G^*(R) = L^H L.$$

Similarly, there exists a lower triangular realization ($\mathbb{C}^N$, L, $R_0$) where L is a lower triangular matrix. The generator L is defined by the lower Cholesky decomposition:

$$G^*(R) = L^H L.$$

We refer to an upper triangular realization of an Hermitian lattice as upper triangular Hermitian lattice, and a lower triangular realization of an Hermitian lattice is referred to as a lower triangular Hermitian lattice.

Standard filtrations. Let (V, G, R) be a based Hermitian lattice with basis $\lambda_i = G(e_i)$, i=1, ..., N. We define two ascending filtrations of V. The lower filtration:

$$0 = V_0 \subset V_1 \subset \ldots \subset V_N = V,$$

where $V_n$ the subspace of V spanned by the basis vectors $\lambda_1, \ldots, \lambda_n$. The upper filtration:

$$0 = V^0 \subset V^1 \subset \ldots \subset V^N = V,$$

where $V^n$ is the subspace of V spanned by the basis vectors $\lambda_{N-n+1}, \ldots, \lambda_N$. In what follows, we use the notations $[R]_n$ and $[R]^n$ for the Schur complements of R with respect to $V_n$ and $V^n$ respectively.

Duality. Based Hermitian lattices admit duals. Let (V, G, R) be a based Hermitian lattice with basis $\lambda_i = G(e_i)$, i=1, ..., N. Let $\lambda^*_i \in V^*$, i=1, ..., N denote the dual basis. Recall that $\lambda^*_i$ is defined by:

$$\lambda_i^*(\lambda_j) = \begin{cases} 1 & j = 1 \\ 0 & \text{otherwise} \end{cases},$$

for every j∈[1, N]. The dual based Hermitian lattice is the triple $(V^*, G^d, R^d)$ where the dual generator is defined by:

$$G^d(e_i) = \lambda^*_i,$$

for every i∈[1, N]. Note that the lattice $\Lambda^* = G^d(\mathbb{Z}_i^N)$ is dual to $\Lambda$ in the conventional sense, namely, $\Lambda^* = \{\alpha \in V^*: \alpha(\lambda) \in \mathbb{Z} \text{ for every } \lambda \in \Lambda\}$.

VBLAST reduced basis. Let (V, G, R) be a based Hermitian lattice. Let $\lambda_1, \ldots, \lambda_N \in V$ be the corresponding basis where $\lambda_i = G(e_i)$. The VBLAST reduction condition is expressed in terms of the dual lattice.

Definition. We say that $\lambda_1, \ldots, \lambda_N$ BLAST reduced basis of $\Lambda$ if it satisfies the following condition:

$$N - n = \underset{k}{\operatorname{argmin}}\{[R^d]^n(\lambda_k^*, \lambda_k^*) : k \in [1, N-n]\}.$$

for n∈[0, N−1].

In words, $\lambda_1, \ldots, \lambda_N$ is VBLAST reduced if the basis vectors are well ordered so that $\lambda^*_{N-n}$ has the minimum dual norm taken mod $\lambda^*_{N-n+1}, \ldots, \lambda^*_N$.

Remark. There is a nice interpretation of the VBLAST well ordering condition in the framework of Wiener theory of decision feedback equalization. Under this interpretation, the last among the first N−n symbols has the maximum SNR after substracting the interference from symbols N−n+1, ..., N. This implies that the VBLAST ordering is optimal with respect to error propagation effect.

VBLAST reduction algorithm. The VBLAST reduction algorithm accepts as input a based Hermitian lattice (V, G, R) and produces as output a based Hermitian lattice (V, G', R) such that:

(1) G'=G∘T where $T \in SL_N(\mathbb{Z}_i)$ is a permutation matrix.
(2) $\lambda'_i = G'(e_i)$, i=1, ..., N is a VBLAST reduced basis of $\Lambda = G(\mathbb{Z}_i^N)$.

The VBLAST change of basis permutation π: [1, N]→[1, N] is defined according to the following recursive formula. At step n∈[0, N−1]. Let $V^*_\pi{}^n \subset V^*$ denote the subspace spanned by $\lambda^*_{\pi(N-n+1)}, \ldots, \lambda^*_{\pi(N)}$.

Let $[R^d]_\pi{}^n$ denote the Schur complement of $R^d$ with respect to $V^*_\pi{}^n$.

Define the value π(N−n) by:

$$\pi(N-n) = \underset{k}{\operatorname{argmin}}\{[R^d]_\pi^n(\lambda_k^*, \lambda_k^*) : k \notin \pi([N-n+1, N])\}.$$

Consequently, the change of basis transformation is the matrix T obtained by permuting the columns of the identity according to π.

LLL (Lenstra-Lenstra-Lovász) reduced basis. One can view the LLL reduction condition as kind of a generalization of the VBLAST reduction condition explained in the previous subsection. Let (V, G, R) be a based Hermitian lattice. Let $\lambda_1, \ldots, \lambda_N \in V$ be the corresponding basis where $\lambda_i = G(e_i)$.

Definition. We say that $\lambda_1, \ldots, \lambda_N$ is an LLL reduced basis of $\Lambda$ if it satisfies the following two conditions:

(1) Size reduction condition:

$$|\operatorname{Re}[R]_{i-1}(\lambda_i, \lambda_j)| \leq \frac{1}{2}[R]_{i-1}(\lambda_i, \lambda_i),$$

$$|\operatorname{Im}[R]_{i-1}(\lambda_i, \lambda_j)| \leq \frac{1}{2}[R]_{i-1}(\lambda_i, \lambda_i),$$

for every i=1, ..., N−1, and j>i.
(2) Well ordering condition:

$$[R]_{i-1}(\lambda_i, \lambda_i) \leq [R]_{i-1}(\lambda_{i+1}, \lambda_{i+1}),$$

for every i=1, ..., N−1.

Note that the size reduction condition implies the inequality:

$$|[R]_{i-1}(\lambda_i, \lambda_j)| \leq \frac{1}{\sqrt{2}}[R]_{i-1}(\lambda_i, \lambda_i),$$

for every i=1, ..., N−1 and j>i. When $\lambda_1, \ldots, \lambda_N$ is LLL reduced basis we say that the generator matrix G is LLL reduced.

Reduction algorithm. We describe two versions of the LLL reduction algorithm. The first version is independent of the specific realization of the lattice and the second version is defined in terms of upper triangular realizations.

Invariant form. The invariant LLL reduction algorithm accepts as input a based Hermitian lattice (V, G, R) and produces as output a (change of basis) based Hermitian lattice (V, G', R) such that:

(1) G'=G∘T where $T \in SL_N(\mathbb{Z}_i)$.
(2) $\lambda'_i = G'(e_i)$, i=1, ..., N is an LLL reduced basis of $\Lambda = G'(\mathbb{Z}_i^N) = G(\mathbb{Z}_i^N)$.

In more details, the algorithm constructs a sequence of generator matrices:

$$G = G^0, G^1, \ldots, G^K = G', \quad (3.5)$$

such that $G^{k+1} = G^k \circ T^k$, $T^k \in SL_N(\mathbb{Z}_i)$. Let $T = T^0 \circ T^2 \circ \ldots \circ T^{N-1}$. The LLL reduced generator $G^K = G \circ T$.

The sequence (3.5) is constructed using two types of change of basis transformations.

Size reduction transformation. Let $j>i\in[1, N]$. Reduce the size of the jth basis vector with respect to the ith basis vector according to the rule $\lambda_j^{k+1}=\lambda_j^k-a\lambda_i^k$ where:

$$a = \left\lceil \frac{[R]_{i-1}(\lambda_i^k, \lambda_j^k)}{[R]_{i-1}(\lambda_i^k, \lambda_i^k)} \right\rfloor.$$

Here $[-]$ stands for the closest Gaussian integer. This transformation is realized by the unimodular matrix:

$$T^k = \begin{bmatrix} 1 & . & 0 & 0 & . & 0 \\ . & . & 0 & 0 & 0 & 0 \\ 0 & 0 & 1 & . & -a & 0 \\ 0 & 0 & 0 & . & . & 0 \\ . & 0 & 0 & 0 & 1 & . \\ 0 & 0 & 0 & 0 & . & 1 \end{bmatrix},$$

i.e., the unit matrix with additional non-zero entry $T^k(i, j)=-a$.

Flipping transformation. Let $i\in[1, N-1]$. Interchange the ith and the i+1th basis vectors according to the rule $\lambda_i^{k+1}=-\lambda_{i+1}^k$ and $\lambda_{i+1}^{k+1}=\lambda_i^k$. This transformation is realized by the unimodular matrix:

$$T^k = \begin{bmatrix} 1 & . & 0 & 0 & . & 0 \\ . & . & 0 & 0 & 0 & 0 \\ 0 & 0 & 0 & 1 & 0 & 0 \\ 0 & 0 & -1 & 0 & 0 & 0 \\ . & 0 & 0 & 0 & . & . \\ 0 & 0 & 0 & 0 & . & 1 \end{bmatrix}$$

i.e., the unit matrix except that $$T^k(i:i+1), (i:i+1) = \begin{bmatrix} 0 & 1 \\ -1 & 0 \end{bmatrix}.$$

Remark. The algorithm applies the size reduction step only if the size reduction condition is not satisfied and applies the flipping transformation always after applying size reduction transformation if and only if the well ordering condition is not satisfied.

Upper triangular form. The upper triangular version of the LLL reduction algorithm accepts as input an upper triangular based Hermitian lattice ($\mathbb{C}^N$, U, $R_0$) and produces as an output an upper triangular based Hermitian lattice ($\mathbb{C}^N$, U', $R_0$) such that:

(1) $U'=A\circ U\circ T$ where $T\in SL_N(\mathbb{Z}_i)$ and $A\in U_N$.
(2) $\lambda'_i=U'(e_i)$, $i=1, \ldots, N$ is an LLL reduced basis of $\Lambda'=U'(\mathbb{Z}_i^N)$.

In some embodiments, the algorithm constructs a sequence of upper triangular matrices:

$$U^0=U, U^1, \ldots, U^K=U', \quad (3.6)$$

such that $U^{k+1}=A^k\circ U^k\circ T^k$ where $T^k\in SL_N(\mathbb{Z}_i)$ and $A^k\in U_N$. Let $T=T^0\circ T^2\circ\ldots\circ T^{N-1}$ and let $A=A^0\circ A^2\circ\ldots\circ A^{N-1}$. The reduced upper triangular realization is given by $U^K=A\circ U^0\circ T$. In what follows we use the notation:

$$U^k = \begin{bmatrix} U_{11}^k & . & . & . & . & U_{1N}^k \\ 0 & U_{22}^k & . & . & . & . \\ 0 & 0 & . & . & . & . \\ . & . & . & . & . & . \\ . & . & . & 0 & . & . \\ 0 & . & . & 0 & . & U_{NN}^k \end{bmatrix}.$$

The sequence (3.6) is constructed using two types of transformations, each being a combination of a change of basis with a change of realization.

Size reduction transformation. Let $j>i\in[1, N]$. Reduce the size of the jth basis vector with respect to the ith basis vector according to the rule $\lambda_j^{k+1}=\lambda_j^k-a\lambda_i^k$ where:

$$a = \left\lceil \frac{[R]_{i-1}(\lambda_i^k, \lambda_j^k)}{[R]_{i-1}(\lambda_i^k, \lambda_i^k)} \right\rfloor = \left\lceil \frac{\overline{U_{ii}^k} \cdot U_{ij}^k}{|U_{ii}^k|^2} \right\rfloor.$$

This is realized by the unimodular matrix:

$$T^k = \begin{bmatrix} 1 & . & 0 & 0 & . & 0 \\ . & . & 0 & 0 & 0 & 0 \\ 0 & 0 & 1 & . & -a & 0 \\ 0 & 0 & 0 & . & . & 0 \\ . & 0 & 0 & 0 & 1 & . \\ 0 & 0 & 0 & 0 & . & 1 \end{bmatrix},$$

i.e., the unit matrix with additional non-zero entry $T^k(i, j)=-a$. To conclude:

$$U^{k+1}=U^k\circ T^k.$$

Note that the upper triangular size reduction transformation has the same form as its invariant counterpart since $U^k\circ T^k$ is already in upper triangular form.

Flipping transformation. Let $i\in[1, N-1]$. Interchange between the ith and the i+1th basis vectors according to the rule $\lambda_i^{k+1}=-\lambda_{i+1}^k$ and $\lambda_{i+1}^{k+1}=\lambda_i^k$ followed by a change of realization to return to upper triangular form. The change of basis matrix is given by:

$$T^k = \begin{bmatrix} 1 & . & 0 & 0 & . & 0 \\ . & . & 0 & 0 & 0 & 0 \\ 0 & 0 & 0 & 1 & 0 & 0 \\ 0 & 0 & -1 & 0 & 0 & 0 \\ . & 0 & 0 & 0 & . & . \\ 0 & 0 & 0 & 0 & . & 1 \end{bmatrix}.$$

The change of realization matrix is defined as follows. Let $G^{k+1}=U^k\circ T^k$. One can verify that $G^{k+1}$ is almost upper triangular except that $L=G^{k+1}(i: i+1, i: i+1)$ is lower triangular. Let $L=QR$ be the Q-R decomposition of L where Q is unitary and R upper triangular. We define:

$$A^k = \begin{bmatrix} 1 & . & 0 & 0 & . & 0 \\ . & . & 0 & 0 & 0 & 0 \\ 0 & 0 & Q_{11} & Q_{12} & 0 & 0 \\ 0 & 0 & Q_{21} & Q_{22} & 0 & 0 \\ . & 0 & 0 & 0 & . & . \\ 0 & 0 & 0 & 0 & . & 1 \end{bmatrix},$$

i.e., $A^k$ is the unit matrix except that $A^k(i: i+1, i: i+1)=Q$. To conclude:

$$U^{k+1}=A^k \circ U^k \circ T^k.$$

Alternatively, we can define $U^{k+1}=G^k$ except that $U^{k+1}(i: i+1, i: i+1)=U$ where $U$ is the upper triangular factor in the Cholesky factorization $L^*L=U^*U$.

The LLL reduction theory in dimension two. For pedagogical reasons it is worthwhile to explain the general theory in the special case when dim V=2. The set-up includes a based Hermitian lattice (V, G, R) where dimV=2. The vectors $\lambda_1=G(e_1)$ and $\lambda_2=G(e_2)$ basis of the corresponding rank 2 lattice $\Lambda=G(\mathbb{Z}_i^2)$.

Definition. We say that $\lambda_1, \lambda_2$ is an LLL reduced basis of $\Lambda$ it satisfies the following two conditions:

(1) Size reduction, condition:

$$|\text{Re}R(\lambda_1, \lambda_2)| \le \frac{1}{2}R(\lambda_1, \lambda_1),$$

$$|\text{Im}R(\lambda_1, \lambda_2)| \le \frac{1}{2}R(\lambda_1, \lambda_1).$$

(2) Well ordering condition:

$$R(\lambda_1,\lambda_1) \le R(\lambda_1,\lambda_1).$$

Note that the size reduction condition implies the inequality:

$$|R(\lambda_1, \lambda_2|) \le \frac{1}{\sqrt{2}}R(\lambda_1, \lambda_1).$$

The nice thing about LLL reduced bases is that they consists of short vectors which are nearly orthogonal to one another. The quantitative meaning of this statement is the content of the following theorem.

Theorem. (Reduction theorem). If $\lambda_1, \lambda_2$ is LLL reduced basis then:

(1) The vector $\lambda_1$ satisfies:

$$\sqrt{R(\lambda_1, \lambda_1)} \le c\sqrt{R(\lambda_{short}, \lambda_{short})},$$

where $c=1/\sqrt{2-\sqrt{2}}$ and $\lambda_{short}$ denotes the shortest non-zero vector in $\Lambda$.

(2) The vector $\lambda_2$ satisfies:

$$\sqrt{R_{V_1^\perp}(\lambda_2, \lambda_2)} \le \sqrt{R_{V_1^\perp}(\lambda, \lambda)},$$

for every vector $\lambda \in \Lambda$ with non-zero orthogonal projection on $V_1^\perp$.

In words, the Theorem asserts that the first basis vector $\lambda_1$ is no longer than a scalar multiple at the shortest non-zero vector in the lattice There the scalar is universal (does not depend on the lattice) and that the second basis vector is the shortest non zero vector mod $\lambda_1$.

Reduction algorithm—invariant form. The algorithm accepts as input a based Hermitian lattice (V, G, R) and produces as output a (change of basis) based Hermitian lattice (V, G', R) such that:

(1) $G'=G \circ T$, where $T \in SL_2(\mathbb{Z})$.

(2) $\lambda'_i=G'(e_i)$, i=1, 2 is an LLL reduced basis of $\Lambda=G(\mathbb{Z}_i^2)$.

In some embodiments, the algorithm constructs a sequence of generator matrices:

$$G=G^0, G^1, \ldots, G^K=G^d. \qquad (3.7)$$

Herein, $G^{k+1}=G^k \circ T^k$ where $T^k \in SL_2(\mathbb{Z}_i)$. The sequence (3.7) is constructed by alternating between the two following basic transformations.

Size reduction transformation. Reduce the size of the second basis vector with respect to the first basis vector according to the rule $\lambda_2^{k+1}=\lambda_2^k-a\lambda_1^k$ where:

$$a = \left[\frac{R(\lambda_1^k, \lambda_2^k)}{R(\lambda_1^k, \lambda_1^k)}\right].$$

This transformation is realized by the unimodular matrix:

$$T^k = \begin{bmatrix} 1 & -a \\ 0 & 1 \end{bmatrix}.$$

Flipping transformation. Interchange the basis vectors according to the rule $\lambda_1^{k+1}=-\lambda_2^k$ and $\lambda_2^{k+1}=\lambda_1^k$. This transformation is realized by the unimodular matrix:

$$T^k = \begin{bmatrix} 0 & 1 \\ -1 & 0 \end{bmatrix}.$$

Reduction algorithm—upper triangular form. The algorithm accepts as input an upper triangular based Hermitian lattice ($\mathbb{C}^2$, U, $R_0$) and produces as output an upper triangular based Hermitian lattice ($\mathbb{C}^2$, U', $R_0$) such that:

(1) $U'=A \circ U \circ T$ where $T \in SL_2(\mathbb{Z}_i)$ and $A \in U_2$.

(2) $\lambda'_i=U'(e_i)$, i=1, 2 is an LLL reduced basis of $\Lambda'=U'(\mathbb{Z}_i^2)$.

In some embodiments, the algorithm constructs a sequence of upper triangular generator matrices:

$$U=U^0, U^1, \ldots, U^K=U', \qquad (3.8)$$

such that $U^{k+1}=A^k \circ G^k \circ T^k$ where $T^k \in SL_2(\mathbb{Z}_i)$ and $A^k \in U_2$. In what follows, we use the notation:

$$U^k = \begin{bmatrix} U_{11}^k & U_{12}^k \\ 0 & U_{22}^k \end{bmatrix}.$$

The sequence of generators in (3.8) is constructed by alternating between the following two type of transformations.

Size reduction transformation. Reduce the size of the second basis vector with respect to the first basis vector according to the rule $\lambda_2^{k+1} = \lambda_2^k - a\lambda_1^k$ where:

$$a = \left\lceil \frac{R(\lambda_1^k, \lambda_2^k)}{R(\lambda_1^k, \lambda_1^k)} \right\rfloor.$$

This transformation is realized by the unimodular matrix:

$$T^k = \begin{bmatrix} 1 & -a \\ 0 & 1 \end{bmatrix}.$$

Flipping transformation. The basis vectors are flipped according to the rule $\lambda_2^{k+1} = -\lambda_1^k$ and $\lambda_1^{k+1} = \lambda_2^k$. This change of basis is realized by the unimodular matrix:

$$T^k = \begin{bmatrix} 0 & 1 \\ -1 & 0 \end{bmatrix}.$$

The resulting matrix $G^{k+1} = U^k \circ T^k$ is lower triangular and is transformed back to upper triangular form by change of realization $A^k = Q$, where Q is the Unitary factor in the QR decomposition of $G^{k+1}$. Alternatively, $U^{k+1} = U$—the upper triangular multiplier in the Cholesky decomposition $G^{k+1*}G^{k+1} = U^*U$.

Convergence of the algorithm. The convergence of the reduction algorithm can be proved by energy considerations. We define the energy functional:

$$E(G) = R(\lambda_1, \lambda_1)^2 [R]_1(\lambda_2, \lambda_2).$$

Considering the sequence in (3.7), we have the following theorem.

Theorem. The following inequality always hold:

$$E(G^{k+1}) \leq E(G^k),$$

moreover, when $G^k$ is flipped we have $E(G^{k+1}) \leq \alpha E(G^k)$ for some $\alpha < 1$.

3.2 Examples of Lattice Detection

Closest lattice point (CLP) problem. The CLP problem emerges as a relaxation of a hard finite quadratic minimization problem called the closest constellation point (CCP) problem. We consider the following general set up:

(1) Let (V, R) be an Hermitian vector space of dimension N.

(2) Let G: $\mathbb{C}^N \to V$ be the generator of a lattice $\Lambda = G(\mathbb{Z}_i^N)$.

(3) Let $\hat{x} \in V$ be a point in V called the soft estimation.

(4) Let $\Omega = (\Lambda + v_0) \cap B$ where B is some bounded set and $v_0 \in V$ is some translation vector. The set $\Omega$ is called the set of constellation points.

The CCP problem is defined by:

$$\hat{x}^h = \operatorname*{argmin}_p \{R(\hat{x} - p] p \in \Omega\} \tag{3.9}$$

Let $\hat{x}_t = \hat{x} - v_0$. The CLP problem is the following relaxation of (3.9):

$$a^* = \operatorname*{argmin}_a \{R(\hat{x}_t - G(a)): a \in \mathbb{Z}_i^N\}. \tag{3.10}$$

Consequently, the derived hard estimation of $\hat{x}$ is given by $\hat{x}^h = G(a^*) + v_0$. Interestingly, the price in performance due to lattice relaxation is negligible.

Remark. Note that the standard QAM constellation sets can be viewed as a truncation of translated Gaussian lattices.

Boosting CLP via lattice reduction. The main advantage in considering the lattice relaxation of the CCP problem is that lattices in contrast to constellation sets admit various bases and realizations which can be used to reduce the complexity of the CLP minimization problem. In particular, let ($\mathbb{C}^N$, U, $R_0$) be an LLL reduced upper triangular realization of (V, G, R). Recall that $$U = A \circ G \circ T,$$

where:

(1) U is upper triangular.

(2) $T \in SL_N(\mathbb{Z}_i)$.

(3) A: $V \xrightarrow{\simeq} \mathbb{C}^N$ is an isomorphism satisfying $A^*(R_0) = R$.

(4) $\lambda_i = U(e_i)$, i=1, ..., N is an LLL reduced basis of the lattice $\Lambda = U(\mathbb{Z}_i^N)$.

Note, that once T is known (for example after applying the invariant LLL reduction algorithm) the matrix U can be obtained via the Cholesky decomposition:

$$(G \circ T)^*(R) = U^H U.$$

Let $\hat{z} = A(\hat{x}_t)$. The CLP problem in the reduced realization is defined by:

$$a^* = \operatorname*{argmin}_a \{\|\hat{z} - U(a)\|^2 : a \in \mathbb{Z}_i^N\}.$$

The hard decision $\hat{x}^h$ is derived from the "reduced" minimum $a^*$ by the rule $\hat{x}^h = G \circ T(a^*) + v_0$. We refer to the CLP problem in the reduced basis as LR CLP.

Lattice detection problems. Herein, CLP relaxations of various detection problems originating from communication theory are described.

Lattice detection problem for a single tap channel. First consider the simpler case of a single tap channel model:

$$y = h(x) + w, \tag{3.11}$$

where:

(1) h: $V \to \mathbb{C}^M$ is the channel transformation.

(2) $x \in \Omega$ is the transmit vector assumed to belong to the constellation set.

(3) $y \in \mathbb{C}^M$ is the received vector.

(4) $w \in \mathbb{C}^M$ is the noise term assumed to be a Gaussian random vector $w \in \mathcal{N}(0, R_{ww})$ mean zero and covariance matrix $R_{ww}$.

In order to define the CLP problem we assume a Gaussian prior $x \in \mathcal{N}(0, R_{xx})$. Typically, $R_{xx} = P \cdot \text{Id}$ for some positive power P. Under these assumptions, the conditional probability of x given y takes the form:

$$\mathbb{P}(x \mid y) \propto e^{-R(\hat{x}-x, \hat{x}-x)},$$

where $R = R_{ee}^{-1} = (h^* R_{ww}^{-1} h + R_{xx}^{-1})$ and $\hat{x} = Cy = R_{ee} h^* R_{ww}^{-1} y$. In words, $\hat{x}$ is the MMSE estimator of x in terms of y and $R_{ee}$ is the covariance matrix of the residual error $e = x - \hat{x}$. The detection problem is defined by:

$$\hat{x}^h = \underset{x}{\arg\max}\{\mathbb{P}(x \mid y) : x \in \Omega\}$$
$$= \underset{x}{\arg\min}\{R(\hat{x} - x) : x \in \Omega\}.$$

Consequently, the CLP relaxation is defined by:

$$a^* = \underset{a}{\arg\min}\{R(\hat{x}_t - G(a)) : a \in \mathbb{Z}_i^N\},$$

where $\hat{x}_t = \hat{x} - v_0$.

Lattice detection problem for a multi-tap channel. Now consider the dispersive channel model:

$$y = h(x) + w, \qquad (3.12)$$

where:

(1) h is the sequence of channel taps, $h[k] \in \text{Hom}(V, \mathbb{C}^M)$, $k \in \mathbb{Z}$.

(2) x is the transmit sequence, $x[n] \in \Omega$, $n \in \mathbb{Z}$.

(3) y is the received sequence, $y[n] \in \mathbb{C}^N$, $n \in \mathbb{Z}$.

(4) w is the noise sequence assumed to be uncorrelated in time with $w[n] \in \mathcal{N}(0, R_{ww})$.

We further assume that the channel is causal, that is, $h[k] = 0$ for every $k < 0$ and finite, that is $h[k] = 0$ for every $k > v$.

The term $h(x)$ in (3.12) stands for the convolution: $h(x) = \Sigma_{k=0}^{v} h[k](x[n-k])$.

In order to define the CLP problem we assume an uncorrelated Gaussian prior on x where $x[n] \in \mathcal{N}(0, R_{xx})$. Under these assumptions, we define $\hat{x}$ to be the decision feedback Wiener estimate of x, given by:

$$\hat{x} = f(y) + b(x). \qquad (3.13)$$

Herein, (1) $f = f[-\mu], \ldots, f[0] \in \text{Hom}(\mathbb{C}^M, V)$, $\mu \in \mathbb{N}^{\leq 1}$ is the Wiener forward filter.

(2) $b = b[1], \ldots, b[v] \in \text{Hom}(V, V)$ is the strict Wiener feedback filter.

For example, (3.13) is the sum of two convolution terms:

$$\hat{x}[n] = \sum_{k=-\mu}^{0} f[k](y[n-k]) + \sum_{k=1}^{v} b[k](x[n-k]).$$

It can be shown that the error sequence $e[n] = x[n] - \hat{x}[n]$ is uncorrelated in time with $e[n] \in \mathcal{N}(0, R_{ee})$. Taking the Hermitian form $R = R_{ee}^{-1}$, the detection problem at time n is defined by:

$$\hat{x}^h[n] = \underset{x}{\arg\min}\{R(\hat{x}[n] - x[n]) : x \in \Omega\}.$$

Consequently, the CLP relaxation at time n is defined by:

$$a^*[n] = \underset{a}{\arg\min}\{R(\hat{x}_t[n] - G(a)) : a \in \mathbb{Z}_i^N\},$$

where $\hat{x}_t[n] = \hat{x}[n] - v_0$.

Computation of DF Weiner filters and the residual covariance matrix. The first step is to translate the channel model in (3.12) into a matrix form. To this end, define the column vectors:

$$Y = [y[0]^T, \ldots, y[\mu]^T]^T \in \text{Mat}(n_y M, 1),$$
$$X = [x[-v]^T, \ldots, x[\mu]^T]^T \in \text{Mat}(n_x M, 1),$$
$$W = [w[0]^T, \ldots, w[\mu]^T]^T \in \text{Mat}(n_y M, 1).$$

where $n_y = \mu + 1$, $n_x = \mu + v + 1$. We define the matrix:

$$H = \begin{bmatrix} h[v] & . & . & h[0] & 0 & . & 0 \\ 0 & . & . & . & . & . & . \\ . & . & . & . & . & . & 0 \\ 0 & . & 0 & h[v] & . & . & h[0] \end{bmatrix} \in \text{Mat}(n_y M, n_x N).$$

Under these conventions, the channel model translates to the matrix equation:

$$Y = HX + W. \qquad (3.14)$$

Furthermore, define the Weiner inverse channel by:

$$X = CY + E, \qquad (3.15)$$

where $C \in \text{Mat}(n_x N, n_y M)$ is the Wiener estimator of X from Y and E is the residual error which, by definition, is uncorrelated with Y. We have the following formulas:

$$R_{EE} = (H^H R_{WW}^{-1} H + R_{XX}^{-1})^{-1},$$
$$C = R_{EE} H^H R_{WW}^{-1}.$$

Consider $R_{EE}$ as an $n_x \times n_x$ block matrix. Let $R_{EE} = LDU$ be the block LDU decomposition where U is block upper triangular with $I_M$ on every block of the diagonal, D is block diagonal and $L = U^H$.

Apply $L^{-1}$ to both sides of the inverse channel equation (3.15) to get:

$$L^{-1} X = L^{-1} CY + L^{-1} E, \qquad (3.16)$$

The equation (3.16) exhibits the property that the new noise term $L^{-1} E$ is uncorrelated in time with $R_{\tilde{E}\tilde{E}} = D$. Write $L^{-1} = I - B$. Note that B is strictly block lower triangular. Substituting in (3.16), we get:

$$X = L^{-1} CY + BX + L^{-1} E. \qquad (3.17)$$

Taking the 0th block coordinate of both sides of Equation (3.17), we get:

$$x[0] = e_0^T L^{-1} CY + e_0^T BX + e_0^T L^{-1} E. \qquad 5$$

We have:
(1) $f[k] = e_0^T L^{-1} C[-k]$, for $k = -\mu, \ldots, 0$.
(2) $b[k] = e_0^T B[-k]$, for $k = 1, \ldots, v$.
(3) $R_{ee} = D_{0,0}$.

Lattice detection problem for a multi-tap 2D channel. Let $N_f \in \mathbb{N}^{\geq 1}$. Let $\mathbb{Z}/N_f$ denote the ring of integers modulo $N_f$. An element $l \in \mathbb{Z}/N_f$ is called a frequency slot. We consider the dispersive 2D channel model:

$$y = h(x) + w, \qquad (3.18)$$

where:
(1) $h[k, l] \in \mathrm{Hom}(V, \mathbb{C}^M)$, $k \in \mathbb{Z}$, $l \in \mathbb{Z}/N_f$, called the 2D channel.
(2) $x[n, l] \in \Omega$, $n \in \mathbb{Z}$, $l \in \mathbb{Z}/N_f$, called the transmit sequence.
(3) $y[n, l] \in \mathbb{C}^N$, $n \in \mathbb{Z}$, $l \in \mathbb{Z}/N_f$, called the receive sequence.
(4) $w[n, l] \in \mathbb{C}^N$, $n \in \mathbb{Z}$, $l \in \mathbb{Z}/N_f$, called the noise sequence.

The noise sequence is assumed to be uncorrelated in time and in frequency with $w[n, l] \in \mathcal{N}(0, R_{ww})$. We further assume that the channel is causal and finite in time, that is, $h[k, l] = 0$ for every $k < 0$ and $k > v$.

The term $h(x)$ in (3.18) stands for 2D convolution:

$$h(x)[n, l] = \sum_{k=0}^{v} \sum_{l_1 + l_2 = l} h[k, l_1](x[n-k, l_2]),$$

where the equation $l_1 + l_2 = l$ under the second sum is taken modulo $N_f$. Hence, the first convolution is linear and the second convolution is cyclic. We assume tin uncorrelated Gaussian prior on x where $x[n, l] \in \mathcal{N}(0, R_{xx})$. Under these assumptions, we define x to be the 2D decision feedback Wiener estimate of x, given by:

$$\hat{x} = f(y) + b(x), \qquad (3.19)$$

where:
(1) $f = f[-\lambda, l], \ldots, f[0, l] \in \mathrm{Hom}(\mathbb{C}^M, V)$, $\mu \in \mathbb{N}^{\geq 1}$ is the 2D Wiener forward filter.
(2) $b = b[1, l], \ldots, b[v, l] \in \mathrm{Hom}(V, V)$ is the strict 2D Wiener feedback filter.

More explicitly, (3.19) is the sum of two convolution terms:

$$\hat{x}[n, l] = \sum_{k=-\mu}^{0} \sum_{l_1 + l_2 = l} f[k, l_1](y[n-k, l_2]) + \sum_{k=1}^{v} \sum_{l_1 + l_2 = l} b[k, l_1](x[n-k, l_2]).$$

It can be shown that the error sequence $e[n, l] = x[n, l] - \hat{x}[n, l]$ is uncorrelated in time and Toeplitz in frequency with $e[n, -] \in \mathcal{N}(0, R_{ee})$, $$R_{ee} = \begin{bmatrix} r_{11} & r_{12} & . & . & r_{1N_f} \\ r_{12}^H & r_{11} & r_{12} & . & . \\ . & . & . & . & . \\ . & . & . & . & r_{12} \\ r_{1N_f}^H & . & . & r_{12}^H & r_{11} \end{bmatrix}.$$

In the definition of the CCP problem we ignore the correlations between different frequencies, by taking $R = r_{11}^{-1}$. The detection problem at time n and frequency l is defined by:

$$\hat{x}^h[n, l] = \arg\min_{x} \{R(\hat{x}[n, l] - x[n, l]) : x \in \Omega\}.$$

Consequently, the CLP relaxation at time n and frequency l is defined by:

$$a^*[n, l] = \arg\min_{a} \{R(\hat{x}_r[n, l] - G(a)) : a \in \mathbb{Z}_i^N\},$$

where $\hat{x}_r[n, l] = \hat{x}[n, l] - v_0$.

Remark. Ignoring the Cross correlations between different frequency slots in the definition of the CCP problem Leads to a sub-optimal relaxation of the joint detection problem of $x[n-] \in \Omega_f^N$. When these cross terms are small compared to the diagonal term $r_{11}$ we expect the loss in performance to be small.

Computation of 2D Wiener filters via Fourier domain representation. Herein, reducing the computation of 2D Wiener filters $f[k, l]$ and $b[k, l]$ and the residual covariance matrix to a 1D computation is described. To this end, the (normalized) DFT along the frequency dimension is applied to the 2D channel model in (3.18). This yields a channel model of the form:

$$Y = H(X) + W, \qquad (3.20)$$

where:
(1) $H[k, l] = \mathrm{DFT}_f(h[n, l])$, $k \in \mathbb{Z}$, $l \in \mathbb{Z}/N_f$.
(2) $X[n, l] = \mathrm{DFT}_f(x[n, l])$, $n \in \mathbb{Z}$, $l \in \mathbb{Z}/N_f$.
(3) $Y[n, l] = \mathrm{DFT}_f(y[n, l])$, $n \in \mathbb{Z}$, $l \in \mathbb{Z}/N_f$.
(4) $W[n, l] = \mathrm{DFT}_f(w[n, l])$, $n \in \mathbb{Z}$, $l \in \mathbb{Z}/N_f$.

We refer to (3.20) as the Fourier domain representation of the 2D channel model (3.18).

Since the DFT is a Unitary transformation, the Fourier noise term remains uncorrelated in time and frequency with $W[n, l] \in \mathcal{N}(0, R_{ww})$. Most importantly, the DFT converts cyclic convolution to multiplication, hence, the Fourier 2D channel model is composed of $N_f$ non-interacting 1D channels, namely:

$$H(X)[n, l] = \sum_{k=0}^{v} H(k, l)(X[n-k, l]),$$

for every $l = 0, \ldots, N_f - 1$. Let $\hat{X} = F(Y) + B(X)$ denote the DF Wiener estimate of X in terms of Y where $F[k, l] \in \mathrm{Hom}(\mathbb{C}^M, V)$ and $B[k, l] \in \mathrm{Hom}(V, V)$ are the forward and backward Wiener filters respectively. One can show that the residual error $E=X-\hat{X}$ is uncorrelated in time and frequency with $E[n, l] \in \mathcal{N}(0, R_{EE}(l))$, $l=0, \ldots, N_f-1$. We have:

$$f[k, l] = IDFT_l(F[k, l]),$$

$$b[k, l] = IDFT_l(B[k, l]),$$

$$r_{11} = \frac{1}{N_f} \sum_{l=0}^{N_f-1} R_{EE}(l).$$

3.3 Examples of CLP Detection Algorithms

In this section, we describe various algorithms for finding the CLP. The algorithms fall into two classes: exact algorithm which find the true minimum and heuristic algorithm which find an approximation of the minimum. The trade-off is complexity. All algorithms incorporate a fundamental weighted tree structure representation of the lattice where leaves of the tree are in 1-1 correspondence with vectors in the lattice. This enables to localize the search problem enabling a branch and bound searching strategies. The different between the various algorithms is the strategy applied to search through the tree.

Set-up. We assume the following set-up:
(1) Let (V, G, R) be a based Hermitian lattice.
(2) Let $\Lambda = G(\mathbb{Z}_i^N)$ be the associated lattice with basis $\lambda_i = G(e_i)$, $i=1, \ldots, N$.
(3) Let $\hat{x} \in V$ be the soft estimation.
The CLP problem is defined by:

$$a^* = \underset{a}{\operatorname{argmin}} \{R(\hat{x} - G(a)) : a \in \mathbb{Z}_i^N\}.$$

In words: find the point in the lattice $\Lambda$ that is the closest to $\hat{x}$ with respect to the Euclidean metric R.

The lattice tree. There exists a canonical weighted tree structure $\mathcal{T}$ associated with (V, G, R) and $\hat{x}$, called the lattice tree. Formally, the lattice tree is a triple $\mathcal{T} = (V, \varepsilon, \omega)$ where:
(1) V is the set of vertices.
(2) $\varepsilon$ is the set of edges.
(3) $\omega: \varepsilon = \mathbb{R}^{\geq 0}$ is a weight function on the edges.

Topology of the lattice tree. The topology of the lattice tree is defined in terms of the standard lattice $\mathbb{Z}_i^N$. The set of vertices is a disjoint union of N+1 layers:

$$V = \bigsqcup_{k=0}^{N} V^k,$$

where $V^k = \{a \in \mathbb{Z}_i^N : a[k] = 0, \ldots, k=1, \ldots, N-K\}$ is the set of vertices at layer k. Consequently, the set of edges is a disjoint union N layers:

$$\varepsilon = \bigsqcup_{k=0}^{N-1} \varepsilon^k,$$

where $\varepsilon^k \subset V^k \times V^{k+1}$ is the set of edges connecting layer k with layer k+1. An edge in $\varepsilon^k$ is an ordered pairs (a, b) such that $b[l] = a[l]$ for every $l \geq N-K+1$. Note that $\mathcal{T}$ is a uniform infinite tree of depth N. The root of $\mathcal{T}$ is the zero vector $0 \in \mathbb{Z}_i^N$. The zero layer $V^0 = \{0\}$. All the branches are of length N and are in one to one correspondence with vectors in $\mathbb{Z}_i^N$. Under this correspondence a vector $a \in \mathbb{Z}_i^N$ is associated with the branch:

$$a^0 \xrightarrow{e^0} a^1 \xrightarrow{e^1} \ldots \xrightarrow{e^{N-1}} a^N,$$

where $a^k \in V^k$ and $e^k = (a^k, a^{k+1}) \in \varepsilon^k$. The vertex $a^k$ is defined by:

$$a^k[l] = \begin{cases} a[l] & l \geq N-K+1 \\ 0 & \text{otherwise} \end{cases},$$

Finally, we introduce the following notation. Given a vertex $a \in V^k$, we denote by out $(a) \subset \varepsilon^k$ the edges emanating from a and if $k \geq 1$, we denote by in $(a) \in \varepsilon^{k-}$ the unique edge that points to a.

The weight structure on the lattice tree. The weight function $\omega$ is defined in terms of the based Hermitian lattice (V, G, R) and the soft estimation $\hat{x}$. Our approach is to first describe a vertex weight function $\mu: V \to \mathbb{R}^{\geq 0}$ and than derive $\omega$ as a localized version of $\mu$. The precise relation between $\omega$ and $\mu$ is:

$$\mu(a^k) = \sum_{l=0}^{k-1} \omega(e^l),$$

for every $a^k \in V^k$ where:

$$0 = a^0 \xrightarrow{e^0} a^1 \xrightarrow{e^1} \ldots \xrightarrow{e^{k-1}} a^k,$$

is the unique branch connecting the root with $a^k$. Let us fix a vertex $a^k \in V^k$.

Definition. The weight $\mu(a^k)$ is defined by:

$$\mu(a^k) = [R]_{N-k}(\hat{x} - G(a^k)). \tag{3.21}$$

In words, $\mu(a^k)$ is the square distance between the vector $\hat{x}$ and the vector $G(a^k)$ measured mod $\lambda_1, \ldots, \lambda_{N-k}$. In order to define $\omega$ we introduce the notation:

$$\hat{x}^k = P_{V_{N-k}}(\hat{x} - G(a^k)). \tag{3.22}$$

Let $e^k = (a^k, a^{k+1}) \in \varepsilon^k$.

Definition. The weight $\omega(e^k)$ is defined by:

$$\omega(e^k) = [R]_{N-k-1}(\hat{x}_k - a^{k+1}[N-k]\lambda_{N-k}). \tag{3.23}$$

The relation between the vertex and edge weights is formalized in the following proposition.

Proposition. We have:

$$\mu(a^{k+1}) = \mu(a^k) \circ \omega(e^k).$$

Explicit formulas for the weight function. In order to write the weight values in explicit form we assume that (V, G, R) is an upper triangular realization, that is:
(1) $V = \mathbb{C}^N$.
(2) G=U is upper triangular matrix.
(3) $R = \langle -, - \rangle$ is the standard Hermitian product on $\mathbb{C}^N$.
In this realization:

$$V_k = \{(x_1, \ldots, x_N) : x_i = 0, i \geq k+1\},$$
$$V_k^\perp = \{(x_1, \ldots, x_N) : x_i = 0, i \geq k\},$$

for every k=0, . . . , N. The orthogonal projections $P_{V_k}$ and $P_{V_k^\perp}$ are given by $x_k = P_{V_k}(x)$ and $x_k^\perp = P_{V_k^\perp}(x)$ where:

$$x_k[n] = \begin{cases} x[n] & n \leq k \\ 0 & \text{otherwise} \end{cases},$$
$$x_k^\perp[n] = \begin{cases} x[n] & n \geq k+1 \\ 0 & \text{otherwise} \end{cases}.$$

Given a vertex $a^k \in V^k$, the weight $\mu(a^k)$ is given by:

$$\mu(a^k) = R_{V_{N-k}^\perp}(\tilde{x} - U(a^k)) \quad (3.24)$$
$$= \|P_{V_{N-k}^\perp}(\hat{x} - U(a^k))\|^2$$
$$= \sum_{l=N-k+1}^{N} |d(l)|^2,$$

where $d = \hat{x} - U(a^k)$. Given an edge $e^k = (a^k, a^{k+1}) \in \varepsilon^k$, the weight $\omega(e^k)$ is given by:

$$w(e^k) = [R]_{N-k-1}(\hat{x}_k - a^{k+1}[N-k]\lambda_{N-k}) \quad (3.25)$$
$$= \|P_{V_{N-(k+1)}^\perp}(\hat{x}_k - a^{k+1}[N-k]\lambda_{N-k})\|^2$$
$$= |\hat{x}_k[N-k] - a^{k+1}[N-k]U_{N-k,N-k}|^2,$$

where $\hat{x}_k = P_{V_{N-k}}(\hat{x} - G(a^k))$.

Remark. In some embodiments, working in an upper triangular realization is beneficial for calculation reasons as the weight formulas can be explicitly expressed in terms of the coefficient of the generator U by a simple recursive formula.

Babai detector. The Babai detector is the simplest heuristic detector. The output of the Babai detector is the branch $a \in \mathbb{Z}_i^N$, $$a^{*0} \xrightarrow{e^{*0}} a^{*1} \xrightarrow{e^{*1}}, \ldots, \xrightarrow{e^{*N-1}} a^{*N},$$

defined recursively as:

$$e^{*k} = \arg\min_e \{w(e) : e \in \text{out}(a^{*k})\},$$

for every k=0, . . . , N−1. In words, the Babai detector is a greedy algorithm that picks the branch that at every layer extends to the next layer via the edge of minimal weight.

Remark. In some embodiments, the Babai lattice detector is equivalent to decision feedback MMSE. However, the performance of the Babai detector after applying LLL basis reduction is significantly superior to the standard DF MMSE.

Sphere detector. The sphere detector is an exact detector. The sphere detector travel through the lattice tree according to a depth first search strategy where the edges in out ($a^k$) are chosen in ascending order according to their weight. The algorithm incorporates a threshold parameter T, initialized in the beginning to T=∞. The algorithm follow the following two rules:
(1) When reaching a leaf $a^N \in V^N$ update $T \leftarrow \mu(a^N)$.
(2) Branch from $a^k \in V^k$ to $a^{k+1} \in V^{k+1}$ only if $\mu(a^{k+1}) < T$.

Figure 9:
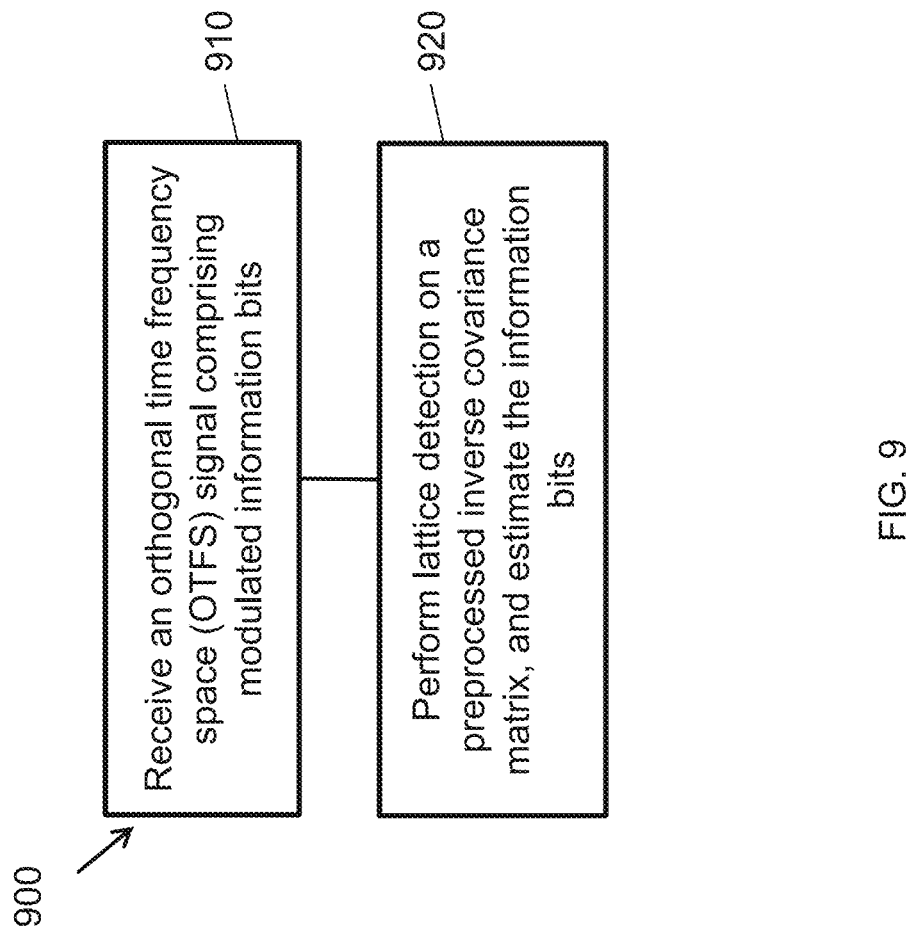
FIG. 9 is a flowchart of an example method of wireless signal reception.

FIG. 9 is a flowchart of a method 900 for wireless data reception. The method 900 includes, at 910, receiving a signal comprising information bits modulated using orthogonal time frequency space (OTFS) modulation scheme, wherein each delay-Doppler bin in the signal is modulated using a quadrature amplitude modulation (QAM) mapping. The method 900 may lead to successful decoding and extraction of the information bits from the signal, using techniques described in the present document.

The method 900 includes, at 920, estimating the information bits by inverting and pre-processing a single error covariance matrix representative of estimation error for all delay-Doppler bins. In other words, estimating the information bits is based on an inverse of a single error covariance matrix of the signal.

As described in the present document, in some implementations, the method 900 may further include computing a unimodular matrix U, and improving numerical conditioning (or equivalently, decreasing the condition number) of the single error covariance matrix by multiplying with U. While the matrix U could be calculated using several methods, e.g., a brute force method, in some embodiments a lattice reduction algorithm (including the exemplary implementations described in Sections 2 and 3) may be used to reduce numerical complexity. In some embodiments, the lattice reduction algorithm may include a size reduction transformation followed by a flipping transformation. In an example, the size reduction transformation may be based on a first unimodular matrix and the flipping transformation may be based on a second (different) unimodular matrix.

The method 900 may also include lattice detection. Further, this may include conversion of the above detected lattice to standard lattice (QAM lattice) and estimating information bits by performing symbol to bit de-mapping. In some embodiments, the method 900 includes, for each delay-Doppler bin, performing a Babai detection (lattice detection) on the output of the lattice reduction algorithm. In some embodiments, the method 900 includes, for each delay-Doppler bin, performing a sphere detection (lattice detection) on the output of the lattice reduction algorithm. In some embodiments, and more generally, the method 900 includes, for each delay-Doppler bin, performing a closest lattice point (CLP) detection on the output of the lattice reduction algorithm. In some embodiments, the lattice reduction algorithm may be implemented using the LLL algorithm, a Block Korkine Zolotarev (BKZ) algorithm, a random sampling reduction (RSR) algorithm or a primal dual reduction (PDR) algorithm.

The method 900 may also include first determining that the inverse of the single error covariance matrix is numerically well-conditioned (or equivalently, having a condition number close to unity), and then performing a slicing operation on the QAM symbols in each of the delay-Doppler bins.

FIG. 10 is a block diagram of an example of a wireless communication apparatus 1000. The apparatus 1000 may include a processor 1002, a memory 1004 and transceiver circuitry 1006. The processor may implement various operations described in the present document that include, but are not limited to, the MIMO turbo equalizer described in Section 2 and the exemplary lattice reduction algorithm implementations described in Section 3. The memory may be used to store code and data that is used by the processor when implementing the operations. The transceiver circuit may receiver OTFS and other types of signals.

It will be appreciated that the present document discloses, among other features, techniques that allow for embodiments that provide near-maximum likelihood performance in OTFS systems. Ideally, maximum likelihood algorithm may produce theoretically best results. However, a Babai detector or a sphere decoder may be used by practical systems to achieve performance nearly as good as ML receivers. As discussed herein, lattice reduction may be used as a pre-processing step for the implementation of a Babai detector or a sphere decoder. In particular, for OTFS modulated signals, implementation of lattice reduction can be made computationally bearable (compared to OFDM signals) by reducing the complexity of implementation by having to invert a single $R_{ee}$ matrix. Furthermore, conditioning of the matrix also becomes a numerically easier task because only one matrix needs to be processed, rather than multiple matrices in case of OFDM systems.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, implementable by a wireless communication receiver apparatus, comprising:

receiving a signal comprising information bits modulated using an orthogonal frequency division multiplexing (OFDM) modulation scheme, wherein each sub-carrier in the signal is modulated using a quadrature amplitude modulation (QAM) mapping;

generating a single error covariance matrix that is an average of error covariance matrixes for the sub-carriers that are grouped according to estimated channel characteristics for the sub-carriers; and estimating the information bits based on an inverse of the single error covariance matrix of the signal, wherein the single error covariance matrix is representative of an estimation error for all sub-carriers in the signal.

2. The method of claim 1, further including:

computing a unimodular matrix comprising integer entries and having a unity determinant; and decreasing a condition number of the inverse of the single covariance matrix based on multiplication with the unimodular matrix.

3. The method of claim 1, further including:

performing, upon determining that the inverse of the single error covariance matrix is numerically well-conditioned, a slicing operation on QAM symbols in all the signal.

4. The method of claim 2, wherein the computing the unimodular matrix includes applying a lattice reduction algorithm to obtain the unimodular matrix.

5. The method of claim 4, wherein the applying the lattice reduction algorithm includes:

applying a Lenstra Lenstra Lovasz (LLL) lattice reduction algorithm.

6. The method of claim 4, further including, for each sub-carrier, performing Babai detection on an output of the lattice reduction algorithm.

7. The method of claim 4, further including, for each sub-carrier, performing sphere detection on an output of the lattice reduction algorithm.

8. The method of claim 4, further including, for each sub-carrier, performing a closest lattice point (CLP) detection on an output of the lattice reduction algorithm.

9. The method of claim 4, wherein the lattice reduction algorithm includes a size reduction transformation followed by a flipping transformation.

10. The method of claim 9, wherein the size reduction transformation is based on the unimodular matrix, and wherein the flipping transformation is based on another unimodular matrix different from the unimodular matrix.

11. The method of claim 4, wherein the lattice reduction algorithm comprises a Lenstra Lenstra Lovasz (LLL) algorithm, a Block Korkine Zolotarev (BKZ) algorithm, a random sampling reduction (RSR) algorithm or a primal dual reduction (PDR) algorithm.

12. The method of claim 1, further including, for each sub-carrier, converting an output of detected symbols to a standard lattice.

13. The method of claim 1, wherein the estimating the information bits includes performing a symbol to bits de-mapping of the QAM symbols.

14. A wireless communication device comprising a processor and transceiver circuitry wherein the transceiver circuitry is configured for receiving a signal comprising information bits modulated using an orthogonal frequency division multiplexing (OFDM) modulation scheme, wherein each sub-carrier is modulated using a quadrature amplitude modulation (QAM) mapping; and wherein the processor is configured to:

generating a single error covariance matrix that is an average of error covariance matrixes for the sub-carriers that are grouped according to estimated channel characteristics for the sub-carriers; and estimate the information bits based on an inverse of the single error covariance matrix of the signal, wherein the single error covariance matrix is representative of an estimation error for all sub-carriers in the signal.

15. The wireless communication device of claim 14, wherein the processor is further configured to:

compute a unimodular matrix comprising integer entries and having a unity determinant; and decrease a condition number of the inverse of the single covariance matrix based on multiplication with the unimodular matrix.

16. The wireless communication device of claim 14, wherein the processor is further configured for:

performing, upon determining that the inverse of the single error covariance matrix is numerically well-conditioned, a slicing operation on QAM symbols in all the signal.

17. The wireless communication device of claim 15, wherein the computing the unimodular matrix includes applying a lattice reduction algorithm to obtain the unimodular matrix.

18. The wireless communication device of claim 17, wherein the applying the lattice reduction algorithm includes:

applying a Lenstra Lenstra Lovasz (LLL) lattice reduction algorithm.

19. The wireless communication device of claim 17, wherein the processor is further configured to, for each sub-carrier, perform Babai detection on an output of the lattice reduction algorithm, or sphere detection on an output of the lattice reduction algorithm, or a closest lattice point (CLP) detection on an output of the lattice reduction algorithm.

20. The wireless communication device of claim 17, wherein the lattice reduction algorithm includes a size reduction transformation followed by a flipping transformation and comprises a Lenstra Lenstra Lovasz (LLL) algorithm, a Block Korkine Zolotarev (BKZ) algorithm, a random sampling reduction (RSR) algorithm or a primal dual reduction (PDR) algorithm.

\* \* \* \* \*